United States Patent
Dermu

(10) Patent No.: US 11,562,014 B1
(45) Date of Patent: Jan. 24, 2023

(54) GENERATING VISUAL MEDIA COLLECTIONS FOR A DYNAMIC SOCIAL NETWORKING ACCOUNT

(71) Applicant: Meta Platforms, Inc., Menlo Park, CA (US)

(72) Inventor: Francois Martin Dermu, Danville, CA (US)

(73) Assignee: Meta Platforms, Inc., Menlo Park, CA (US)

(*) Notice: Subject to any disclaimer, the term of this patent is extended or adjusted under 35 U.S.C. 154(b) by 179 days.

(21) Appl. No.: 16/560,857

(22) Filed: Sep. 4, 2019

(51) Int. Cl.
*G06F 16/435* (2019.01)
*G06F 16/483* (2019.01)
*G06F 16/438* (2019.01)
*G06F 16/41* (2019.01)

(52) U.S. Cl.
CPC ............ *G06F 16/435* (2019.01); *G06F 16/41* (2019.01); *G06F 16/438* (2019.01); *G06F 16/483* (2019.01)

(58) Field of Classification Search
CPC ...... G06F 16/435; G06F 16/41; G06F 16/438; G06F 16/483
See application file for complete search history.

(56) References Cited

U.S. PATENT DOCUMENTS

| | | | | |
|---|---|---|---|---|
| 2012/0110052 A1* | 5/2012 | Smarr | ..................... | G06F 3/048 709/201 |
| 2012/0110064 A1* | 5/2012 | Chen | ..................... | G06Q 10/10 709/203 |
| 2014/0075317 A1* | 3/2014 | Dugan | ................ | G06F 3/04842 715/719 |
| 2014/0355907 A1* | 12/2014 | Pesavento | .............. | G06V 20/10 382/305 |
| 2018/0188916 A1* | 7/2018 | Lyons | ................... | G06F 3/0482 |
| 2018/0356961 A1* | 12/2018 | Lewis | ..................... | H04L 51/14 |

OTHER PUBLICATIONS

Pinterest.com; "Create a board"; Downloaded Nov. 13, 2019; https://help.pinterest.com/en/article/create-a-board.
Wikipedia: The Free Encyclopedia; "Pinterest"; Downloaded Nov. 13, 2019; https://en.wikipedia.org/wiki/Pinterest.

* cited by examiner

*Primary Examiner* — Ashish Thomas
*Assistant Examiner* — Yohanes D Kelemework
(74) *Attorney, Agent, or Firm* — Keller Preece PLLC

(57) ABSTRACT

The present disclosure describes systems, non-transitory computer-readable media, and methods for generating a visual media collection for a social networking account and provide access to (or distribute) images, videos, or other visual media items from the visual media collection separate from social networking posts uncategorized within such a collection for the social networking account. For example, based on follow requests specific to a visual media collection, the disclosed systems can further distribute visual media items in collections posts from a particular visual media collection differing from other visual media collections and from social networking posts uncategorized within such a collection of a social networking account. In certain implementations, the disclosed systems further provide search results comprising a visual media item from a visual media collection based on a description or annotation for the visual media collection or a shared visual media collection with another visual media item.

20 Claims, 14 Drawing Sheets

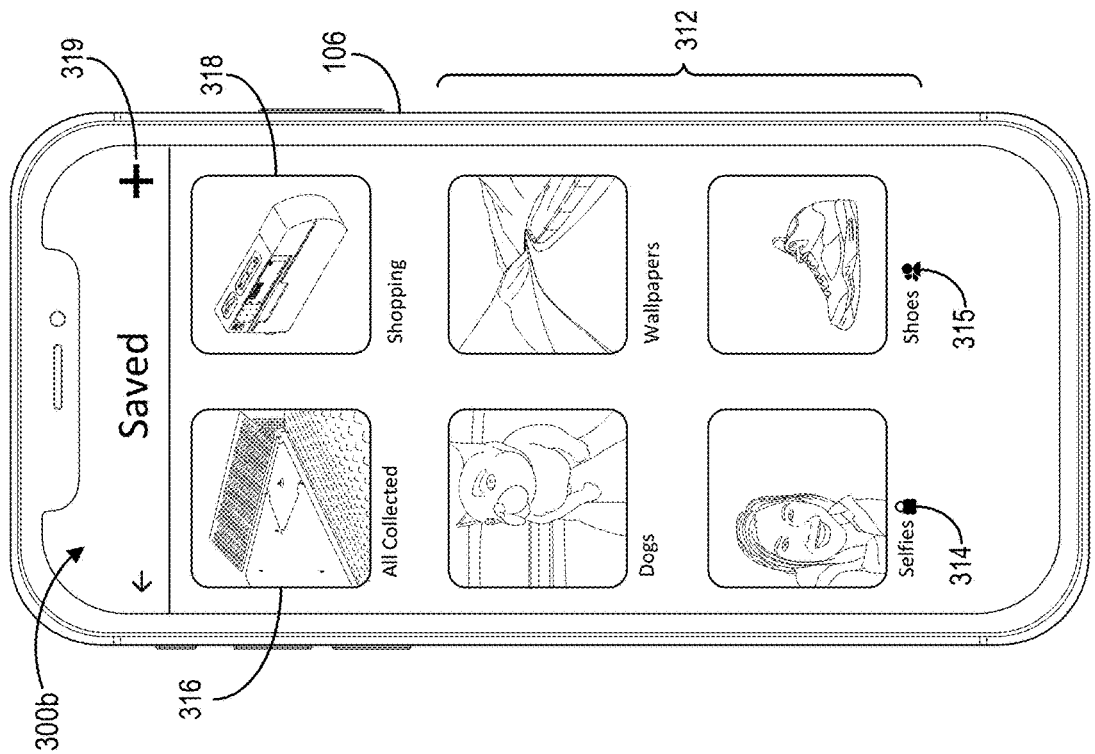
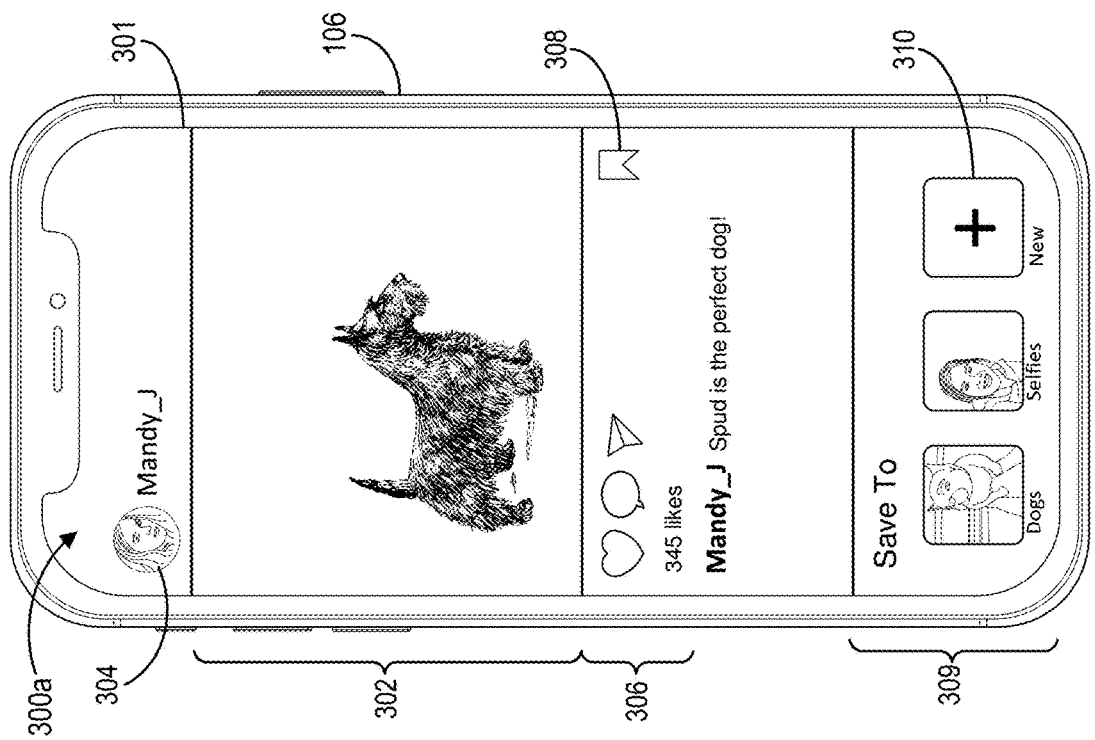
Fig. 3A
Fig. 3B

GENERATING VISUAL MEDIA COLLECTIONS FOR A DYNAMIC SOCIAL NETWORKING ACCOUNT

BACKGROUND

Content-sharing systems increasingly post and distribute visual media from network users across the Internet. Indeed, some content-sharing systems currently provide options for users to post communications with still digital images, videos, or other visual media captured by or downloaded by a personal computing device, such as a smartphone. In some instances, a content-sharing system distributes visual media from one user to the user's followers within the content-sharing system.

Various users leverage content-sharing systems to more easily distribute visual media to target audiences interested in particular topics. But conventional content-sharing systems often limit users to curating and distributing content feeds focused on a particular topic, such as a board of posts with a particular theme. Conventional topic-limited-content feeds silo content-sharing systems into a rigid organization and consequently isolate users into subscribing to fixed content feeds and sometimes to subscribing to another user's content feeds containing posts of topics irrelevant to the subscribing user.

Due to the high volume of visual media in content feeds, many conventional content-sharing systems present graphical user interfaces that require a large number of interactions for a user to locate a particular image, video, or other visual media item. For example, some conventional content-sharing systems require that a user download a visual media item to locate the visual media item at a later time. But such downloading is an inefficient use of client device storage. Further, conventional content-sharing systems requiring such downloads often force a user navigate out of a content-sharing application to view the downloaded visual media.

Additionally, some conventional content-sharing systems require that a user utilize a search function to re-locate a particular visual media item. But locating visual media through search terms often requires many searches and scrolling through many visual media items. Conventional content-sharing systems thus require an undue number of interactions across multiple graphical user interfaces to locate visual media items. Such repeated searching and scrolling wastes system and client device computing resources.

Accordingly, many conventional content-sharing systems limits content feeds to a rigid organizational structure, lack suitable mechanisms for re-locating and viewing particular visual media items, and make inefficient use of system and client device storage and computing resources.

SUMMARY

This disclosure describes one or more embodiments of methods, non-transitory computer readable media, and systems that solve the foregoing problems in addition to providing other benefits. For example, the disclosed systems can generate a visual media collection for a social networking account and provide access to (or distribute) images, videos, or other visual media items from the visual media collection separate from social networking posts uncategorized within such a collection for the social networking account. Based on follow requests specific to a visual media collection, the disclosed systems can further distribute visual media items in collections posts from a particular visual media collection differing from other visual media collections and from social networking posts uncategorized within such a collection of a social networking account. In certain implementations, the disclosed systems further provide search results comprising a visual media item from a visual media collection based on a description or annotation for the visual media collection or a shared visual media collection with another visual media item.

To illustrate, in some embodiments, the disclosed systems receive a visual media item selected by a user of the system for inclusion in a visual media collection corresponding to a social networking account. Based on receiving the visual media item, the disclosed systems generate the visual media collection for a co-user of the system to access, where the visual media collection includes the visual media item. The systems further add the visual media collection to a collections compilation of the social networking account. By generating the visual media collection of the social networking account, the disclosed systems provide access to the visual media item in the collections compilation separate from another visual media item from a social networking post in a posting compilation of the social networking account.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 3A-3G illustrate example graphical user interfaces for a collector device for generating and editing visual media collections in accordance with one or more embodiments.

DETAILED DESCRIPTION

Figure 1:
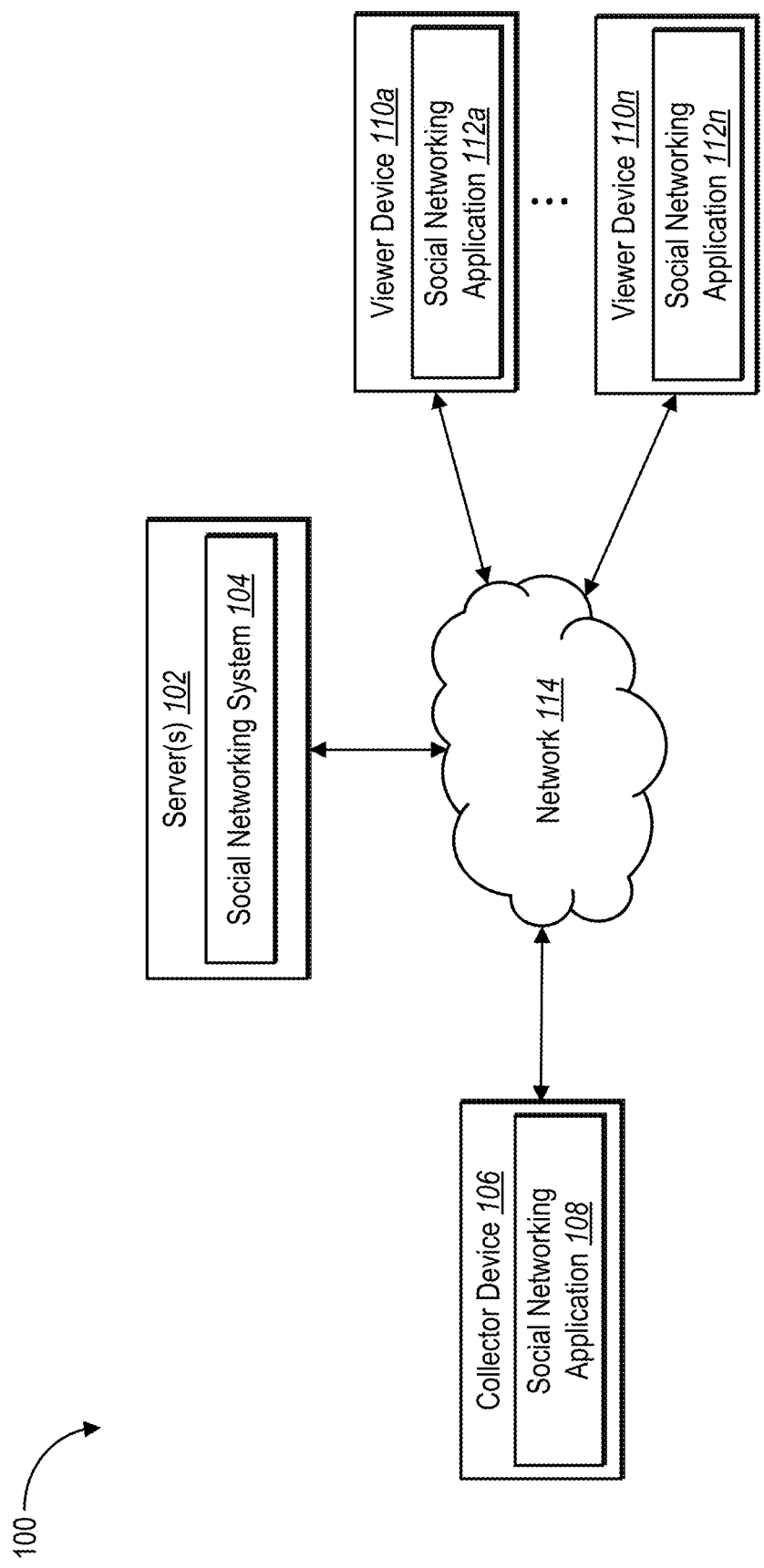
FIG. 1 illustrates a diagram of an environment in which a social networking system can operate in accordance with one or more embodiments.

This disclosure describes one or more embodiments of a social networking system that can generate a visual media collection for a social networking account and provide access to (or distribute) visual media items from the visual media collection separate from social networking posts uncategorized within such a collection for the social networking account. In some embodiments, the social networking system generates a visual media collection comprising visual media items in a collections compilation separate from a posting compilation comprising visual media items for social networking posts of the social networking account. Based on follow requests specific to a visual media collection, the social networking system can further distribute visual media items in collections posts from a particular visual media collection differing from other visual media collections and from social networking posts uncategorized within such a collection of a social networking account.

For example, in certain implementations, the social networking system receives a first visual media item selected by a user of the system for inclusion in a visual media collection corresponding to a social networking account. Based on receiving the first visual media item, the social networking system generates the visual media collection for a co-user of the system to access, where the visual media collection includes the visual media item. The social networking system further adds the visual media collection to a collections compilation of the social networking account.

By contrast, the social networking system receives a second visual media item selected by the user for inclusion in a social networking post corresponding to the social networking account. Based on receiving the second visual media item, the social networking system generates the social networking post comprising the second visual media item for the social networking account. The social networking system further adds the social networking post to a posting compilation of the social networking account, where the posting compilation is separate from the collections compilation.

As suggested above, the social networking system can receive an indication of user selection of a visual media item from a variety of different contexts and via different graphical user interfaces. For example, the social networking system can generate a visual media collection based on receiving an indication of a user selection of a visual media item from a client device, a software application or website, or a posting compilation of a social networking account. As for the latter posting compilation, the social networking system can receive such an indication of based on a selection from the collection-posting user's own posting compilation or from a co-user's posting compilation. For example, the social networking system can receive an indication of a user selection of an option to "save" or "collect" a visual media item on the user's social networking feed.

As noted above, in addition to generating a visual media collection, the social networking system can add the visual media collection to a collections compilation. In one or more embodiments, the collections compilation includes each visual media collection associated with a user's social networking account. Accordingly, a collections compilation includes visual media items selected for inclusion in visual media collections. By contrast, a posting compilation includes visual media items selected by the user for inclusion in social networking posts uncategorized within a visual media collection. When the social networking system provides a graphical user interface corresponding to a user profile for display on a client device, for example, the social networking system can include visual media collections corresponding to the collections compilation separately from social networking posts corresponding to a posting compilation of the user's social networking account.

As noted above, the social networking system can provide visual media items from visual media collections to viewer devices associated with co-users of the social networking system. In tandem with providing a co-user access to a particular visual media collection, for example, the social networking system can provide an option for the co-user to "follow" the particular visual media collection. In response to receiving a request to follow a visual media collection, the social networking system can provide visual media items from the visual media collection within the viewer's social networking feed. Specifically, the social networking system can provide the visual media items in collections posts within the viewer's social networking feed—separate from the collection-posting user's social networking posts. Accordingly, the social networking system can include collections posts including visual media items from a visual media collection in a co-user's social networking feed without the collection-posting user's social networking posts.

The social networking system can also generate collaborative visual media collections. For example, the social networking system can grant multiple contributors access to a visual media collection. In some cases, the social networking system receives an indication of a user selection of a contributor for a visual media collection. Based on this user selection, the social networking system grants access to the designated contributor to add visual media items to the visual media collection. In some embodiments, the social networking system can grant various permissions for the visual media collection to a social networking account associated with a designated contributor. For example, the social networking system can provide permission to add, remove, and/or edit visual media items for the visual media collection.

In addition to granting co-users access or permissions to a visual media collection, the social networking system can integrate into (and identify visual media items from) visual media collections for search results. To illustrate, the social networking system can receive a search query including a search term from a client device. The social networking system can then determine that a search query relates to a visual media collection. In some cases, for example, the social networking system provides a visual media item from a visual media collection in a search result because the social networking system determines that a search term corresponds to (i) the name of a visual media collection, (ii) user annotations associated with the visual media collection, or (iii) an additional visual media item that is part of the same visual media collection. Based on that determination, the social networking system can provide search results including visual media items from the visual media collection.

As suggested above, the social networking system overcomes several technical deficiencies that hinder conventional content-sharing systems. For example, the social networking system improves the flexibility with which a content-sharing system distributes and presents content from both visual media collections and social networking posts. Rather than limiting a social networking account to only social networking posts or to only content feeds focused on a particular topic, the disclosed social networking system can both generate collections posts for visual media items from visual media collections of a social networking account and social networking posts comprising visual media items from the social networking account.

By separately providing tools to create and curate a visual media collection and social networking posts uncategorized within such a collection, the social networking system increases precision and specificity in curating visual media distributed to a social networking feed or posted on a user profile. Unlike conventional content-sharing systems that host servers prescribing rigid organization for a social networking account, the disclosed social networking system can use servers that generate and maintain a posting compilation for social networking posts and a collections compilation for visual media collections separately.

In addition to increased flexibility, the social networking system improves the efficiency of conventional content-sharing systems by providing graphical user interfaces facilitating rapid access to and tailored distribution of a collection-posting user's visual media collection. For example, the social networking system provides a collections user interface including various visual media collections from a user's collections compilation. By separating a collections user interface from a postings user interface, the social networking system provides all of a collection-posting user's collected visual media items in an orderly and organized manner, according to the collection-posting user's selections. The disclosed social networking system accordingly avoids causing users to scroll through search results, a social networking feed, or a user profile to re-locate a visual media item. Instead, the social networking system provides a graphical user interface that requires fewer user interactions than conventional content-sharing systems to re-locate a visual media item from either a visual media collection or a social networking post uncategorized within such a collection.

As illustrated by the foregoing discussion, the present disclosure utilizes a variety of terms to describe features and advantages of the social networking system. For example, as used herein, the term "visual media item" refers to a digital image or series of images. In particular, a visual media item can include still digital images, digital videos, gifs, and/or other visual digital media. To illustrate, a visual media item can include a digital photo that a user captures using a camera on a computing device and shares with other users of a social networking system. A visual media item can originate from any source. For instance, a user can capture a visual media item with a computing device, receive a copy of a visual media item from another computing device, or download a visual media item from the Internet. Moreover, a visual media item can include one or more user annotations or other content item characteristics.

Further, as used herein, the term "visual media collection" refers to a grouping of one or more visual media items. In particular, the term "visual media collection" can include a set of visual media items selected by one or more users for a social networking system to group together in a collection. Accordingly, a visual media collection can include a set of visual media items provided for display together within a graphical user interface based on user selection and/or shared characteristics. For example, a visual media collection can include a publicly available set of digital images selected by a single user or a set of digital videos available only to multiple contributors. In some embodiments, a visual media collection includes various content item characteristics, such as a name, associated text, user annotations, or other content item characteristics.

Relatedly, the term "collections compilation" refers to a set of visual media collections associated with or from a social networking account. In particular, a collections compilation can include a grouping of visual media collections generated by a social networking system for a particular user and associated with a particular social networking account. In some embodiments, the social networking system provides a representation of a collections compilation as a set of thumbnail images or "cover" visual media items corresponding to visual media collections in a user's collections compilation. For example, the social networking system may provide a visual representation of a collections compilation in a graphical user interface comprising a thumbnail image representing a public visual media collection of photos of dogs, another thumbnail image representing a private visual media collection of gifs, and still another thumbnail image representing a collaborative visual media collection of various media types.

Additionally, as used herein, the term "social networking account" refers to an arrangement in which a person or other entity uses and is granted access to a social networking system. In some cases, a social networking account can include personalized login credentials and/or a personalized social networking experience provided based on those personalized login credentials. To illustrate, a social networking system can grant a user associated with a social networking account access to various social networking features, provide a personalized user profile or a personalized social networking feed, and/or create or track personalized connections on the social networking system. A social networking account can be associated with a one or more users and one or more client devices.

Relatedly, as used herein, the term "social networking post" refers to a digital piece of writing, an image, a video, or other visual media item published by a social networking system. For example, a social networking post can include a visual media item or set of visual media items submitted by a user for a social networking system to publish on the user's user profile and to provide for display within social networking feeds of the user's followers. A social networking post can be added to a posting compilation for a social networking account and include visual media items, text, user-defined annotations (e.g., hashtags), images, gifs, videos, emoticons, and/or other kinds of multimedia. Moreover, a social networking system can publish a social networking post in a portion of a user profile separate from a visual media collection. Accordingly, this disclosure generally describes a social networking post uncategorized within a visual media collection.

As used herein, the term "collections post" refers to a post comprising a visual media item or set of visual media items corresponding to a visual media collection. For example, a collections post can include a post published by a social networking system in in social networking feed for a user following a visual media collection. In some embodiments, a social networking system publishes a collections post as part of a visual media collection or upon (or at the same time as) adding the collections post to a visual media collection. A collections post can be included in the social networking feeds of user accounts following a corresponding visual media collection.

Also, as used herein, the term "posting compilation" refers to a set of social networking posts associated with or from a social networking account. In particular, a posting compilation can include a grouping of social networking posts generated by a social networking system and associated with a specific social networking account. In some embodiments, the social networking system provides a representation of a posting compilation as a set of thumbnail images for a corresponding set of social networking posts associated with or from a social networking account. For example, the social networking system may provide a visual representation of a posting compilation in a graphical user interface comprising a thumbnail image representing different social networking posts corresponding to a social networking account.

As used herein, the term "social networking feed" refers to a collection of posts selected for or provided to a particular user corresponding to a social networking account or a collection of posts composed or created by a particular user corresponding to a social networking account. In particular, a social networking feed can include one or both of social networking posts and collections posts comprising visual media items from visual media collections that a social networking account follows or that the social networking system selects for a particular user. By contrast, a social networking feed associated with a user profile can include one or both of social networking posts and collections posts composed or created by a particular user and made available to co-users via a user profile.

Additionally, as used herein, the term "purchasable-items collection" refers to a visual media collection including visual media items portraying or otherwise indicating products, services, or other items available for purchase. For example, a purchasable-items collection can include a visual media item including a photo of a model wearing a dress available to buy, a visual media item including a link to a webpage posting camera for sale, and/or a visual media item including a digital image of a logo of a cosmetics line and a link to an online storefront for that cosmetics line.

Turning now to the figures, FIG. 1 illustrates a block diagram of one embodiment of a social networking environment 100. As illustrated in FIG. 1, the social networking environment 100 includes the server(s) 102, including a social networking system 104. The social networking environment 100 further includes a collector device 106 including a social networking application 108 and viewer devices 110a-110n including social networking application 112a-112n, respectively.

As illustrated in FIG. 1, the collector device 106 and the viewer devices 110a-110n can communicate with the server(s) 102, including the social networking system 104, over a network 114. Additional details related to the social networking system 104 are discussed below with regard to FIGS. 7-8. In addition, the network 114 may represent a network or collection of networks, such as the Internet, a local area network ("LAN"), a wide area network ("WAN"), or a combination of such networks described above or below. Thus, the network 114 may be any suitable network over which the collector device 106 and the viewer devices 110a-110n (or other components) may access the social networking system 104 (or vice versa).

As described below, the server(s) 102 can enable the various functions, features, processes, methods, and systems described in this disclosure using, for example, instructions within the social networking system 104. Additionally, or alternatively, the server(s) 102 coordinate with the collector device 106 and/or the viewer devices 110a-110n to perform or provide the various functions, features, processes, methods, and systems described in more detail below. Although FIG. 1 illustrates a particular arrangement of the server(s) 102, the social networking system 104, the collector device 106, the viewer devices 110a-110n, and the network 114, various additional arrangements are possible. For example, the social networking system 104 and the server(s) 102 may directly communicate with the collector device 106 and/or the viewer devices 110a-110n and thus bypass the network 114.

Generally, the collector device 106 and viewer devices 110a-110n can include any one of various types of client devices. For example, the collector device 106 or the viewer devices 110a-110n can include a (e.g., a smart phone), tablet, laptop computer, desktop computer, or any other type of computing device as further explained below with reference to FIG. 7. Additionally, the server(s) 102 can include one or more computing devices including those explained below with reference to FIG. 7. Moreover, the server(s) 102, the social networking system 104, the collector device 106, the viewer devices 110a-110n, and the network 112 can communicate using any communication platforms and technologies suitable for transporting data and/or communication signals, including any known communication technologies, devices, media, and protocols supportive of data communications, examples of which are described below with reference to FIG. 7.

As an overview of the social networking environment 100, the server(s) 102 provide the collector device 106 and the viewer devices 110a-110n access to the social networking system 104 through the network 112. In one or more embodiments, when accessing the server(s) 102 of the social networking system 104, the collector device 106 transmits digitally encoded data to the social networking system 104, such as digitally encoded data representing a selection of a visual media item, generation of a visual media collection, or transmission of a social networking post or collections post, or a comment. The social networking system 104 can provide, for example, a website that enables the user to select a visual media item for inclusion in a visual media collection within the social networking system 104. Conversely, in one or more embodiments, when the viewer devices 110a-110n access the server(s) 102 of the social networking system 104 (e.g., through a website), the viewer devices 110a-110n receive a transmission of digitally encoded data from the social networking system 104, such as digitally encoded data representing a visual media item or visual media items within a particular visual media collection.

Alternatively, the collector device 106 and the viewer devices 110a-110n communicate with the server(s) 102 of the social networking system 104 via a dedicated application on the collector device 106 and the viewer devices 110a-110n, respectively. In some embodiments, the social networking application 108 and the social networking applications 112a-112n comprise web browsers, applets, or other software applications (e.g., a native applications) available to the collector device 106 and the viewer devices 110a-110n, respectively. In some instances, the social networking application 108 and the social networking applications 112a-112n include instructions that, when executed by a processor, cause the collector device 106 and the viewer devices 110a-110n to respectively perform various functions or present one or more graphical user interfaces.

The collector device 106 may launch the social networking application 108 to facilitate interacting with the social networking system 104. In some such embodiments, the social networking application 108 coordinates communications between the collector device 106 and the server(s) 102 such that, for example, the collector device 106 detects user input selecting a visual media item for inclusion in a visual media collection. The collector device 106 can then send that user input to the social networking system 104 (and the social networking system 104 in turn provide the visual media item from the visual media collection to the viewer devices 110a-110n) or access webpages of the social networking system 104.

To facilitate user interaction with the social networking system 104, the social networking application 108 can comprise instructions causing the collector device 106 to present one or more graphical user interfaces associated with the social networking system 104; receive indications of interactions of the user with the graphical user interfaces; and perform various requests, queries, or responses to other user input. Similarly, the social networking applications 112a-112n may perform the same functions for the viewer devices 110a-110n as the social networking application 108 performs for the collector device 106.

For example, the graphical user interfaces of the social networking application 108 and social networking applications 112a-112n facilitate the generation, maintenance, and viewing of visual media collections. Based on receiving an interaction between a collection-posting user and a graphical user interface provided by the collector device 106, the social networking system generates and provides a visual media item from a visual media collection for viewing via the viewer devices 110a-110n. For example, the collector device 106 can detect a selection of a visual media item for inclusion in a visual media collection.

Figure 2A:
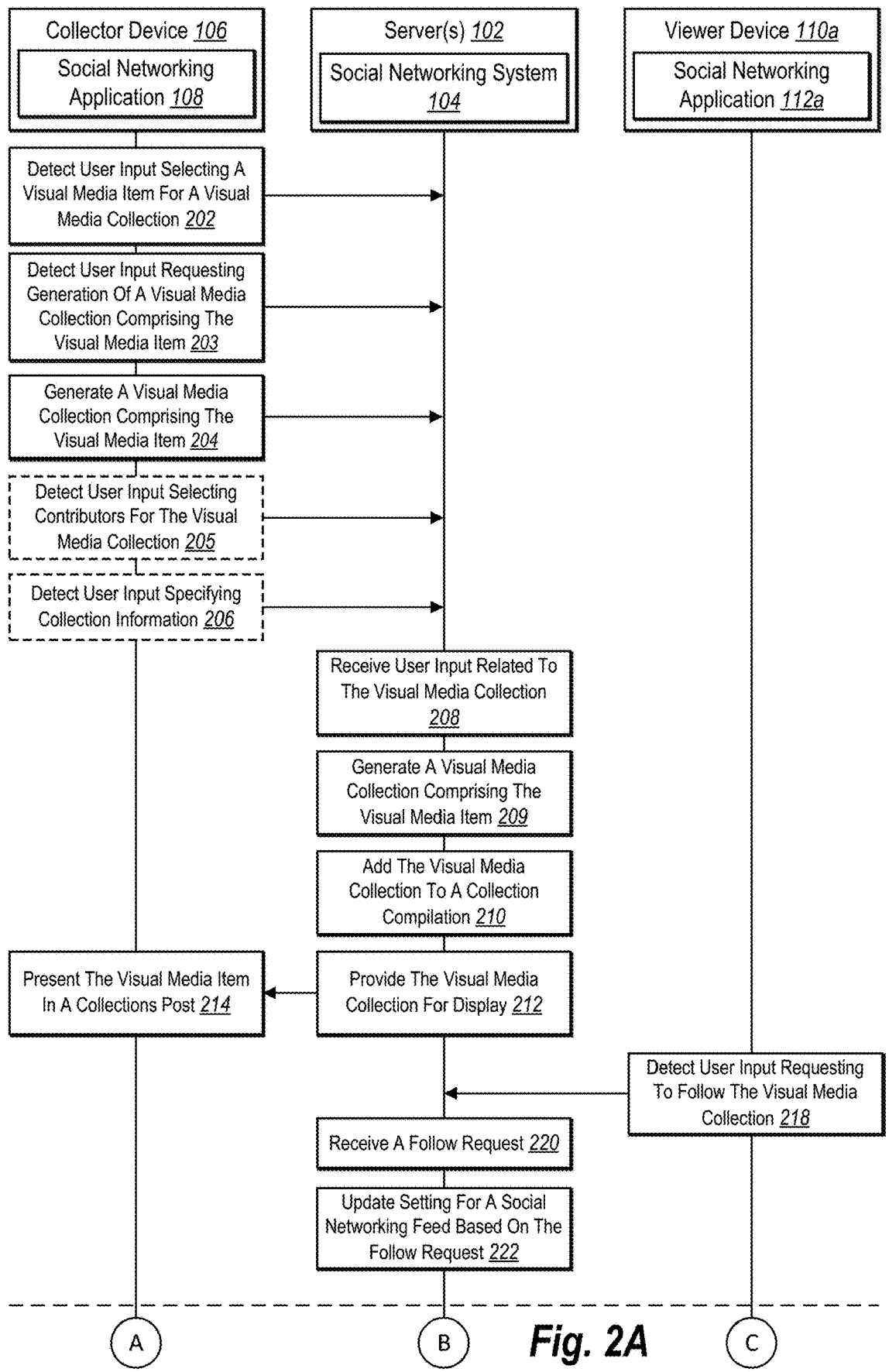
FIGS. 2A-2B illustrate for a sequence-flow diagram of generating and modifying visual media collections within a social networking system in accordance with one or more embodiments.
Figure 2B:
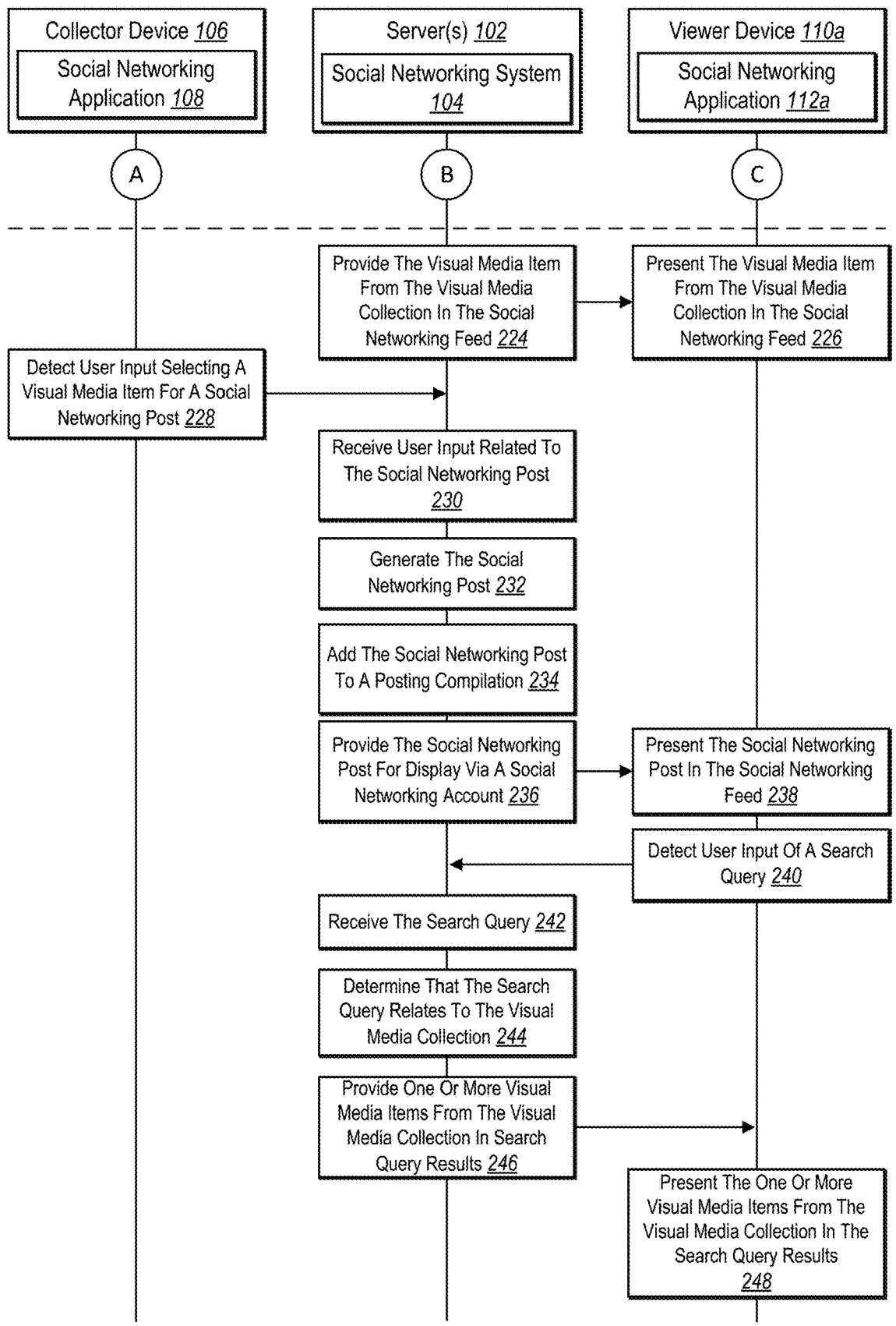

Turning now to FIGS. 2A-2B, these figures provide sequence-flow diagrams of the social networking system 104 generating and providing access to a visual media collection separate from a social networking post uncategorized within such a collection in accordance with one or more embodiments. Specifically, FIGS. 2A-2B illustrate a representation of a acts 202-248 that the server(s) 102, the collector device 106, or the viewer device 110a perform to generate or distribute a visual media item from a visual media collection. For instance, in some embodiments, the server(s) 102, the collector device 106, or the viewer device 110a include computer-executable instructions that, when executed by a processor thereon, cause the server(s) 102, the collector device 106, or the viewer device 110a to perform one of the acts 202-248 shown in the sequence-flow diagram of FIGS. 2A-2B. While the social networking system 104 comprises instructions that (upon execution) cause the server(s) 102 to perform certain actions, this disclosure describes the social networking system 104 as performing such actions below for brevity.

Consistent with the disclosure above, in some embodiments, the collector device 106 transmits (and the social networking system 104 receives) user input indicating a selection of a visual media item. Specifically, as shown in FIG. 2A, the collector device 106 performs the act 202 of detecting user input selecting a visual media item for a visual media collection. For example, in some embodiments, the collector device 106 detects user input selecting an image, video, or other visual media item for inclusion in a visual media collection. Additionally, in certain implementations, the collector device 106 detects user input selecting additional visual media items for inclusion in the visual media collection. As also shown in FIG. 2A, the collector device 106 transmits to the server(s) 102 an indication of the user input selecting the visual media item for inclusion in a visual media collection.

In addition to selecting a visual media item, the collector device 106 performs the act 203 of detecting user input requesting generation of a visual media collection comprising the visual media item. For example, the collector device 106 can detect user input requesting generation of a visual media collection including a particular visual media item via a variety of graphical user interfaces. For example, the collector device 106 may detect a selection of an option to generate a visual media collection via a graphical user interface through which the collector device 106 receives information about a potential visual media collection or provides suggested visual media items for a visual media collection. As indicated in FIG. 2A, the collector device 106 then transmits the request to generate the visual media collection to the server(s) 102.

As further shown in FIG. 2A, the collector device 106 performs the act 204 of generating a visual media collection comprising the visual media item. In one or more embodiments, the collector device 106 generates the visual media collection including the visual media item and any additional visual media items selected for inclusion in the visual media collection. The collector device 106 can further include (or attach as metadata) any other information concerning the visual media collection input by the collection-posting user, such as a name or description of the visual media collection. As further shown in FIG. 2A, in some embodiments, the collector device 106 transmits to the server(s) 102 data indicating the contents of the generated visual media collection or an indication to generate the visual media collection on the server(s) 102.

Additionally, or alternatively, in some embodiments, the collector device 106 generates the visual media collection based on receiving information or metadata concerning selected visual media items for a visual media collection from the social networking system 104. Such information may include, for example, data underlying a collections post from which a visual media item was selected. As discussed below, in one or more embodiments, the social networking system 104 generate the visual media collection based on one or more visual media items and/or based on information concerning a selected visual media item (e.g., a collections-post identifier) or collection information (e.g., a collection identifier) received from the collector device 106. The collector device 106 can receive such information from the server(s) 102 and generate the visual media collection based on the received information concerning selected visual media items or collection information. In one or more embodiments, the collector device 106 generates a "copy" or version of the visual media collection maintained on the collector device 106 based on the information from the social networking system 104.

As further shown in FIG. 2A, the collector device 106 optionally performs the act 205 of detecting user input selecting contributors for the visual media collection. As discussed below, the social networking system 104 can generate and maintain visual media collections where multiple contributors (e.g., contributing users) have access to the visual media collection. For example, the social networking system 104 can facilitate the generation of a visual media collection where multiple social networking accounts have access to add visual media items to the visual media collection. When performing the act 205, the collector device 106 can detect user input selecting one or more contributors for a particular visual media collection. The collector device 106 can detect this input during the creation of a visual media collection or as an edit to an existing visual media collection. As indicated by FIG. 2A, the collector device 106 transmits the selected contributors to the social networking system 104.

In addition to selecting contributors, the collector device 106 optionally performs the act 206 of detecting user input specifying collection information. Specifically, the collector device 106 can detect user input related to a particular visual media collection. For example, in some embodiments, the collector device 106 receives user input specifying a particular name, description, associated user annotations (e.g.

hashtags), and/or publicity settings (e.g., marking the visual media collection public or private) for the visual media collection. Similar to selection of contributors, the collector device 106 can receive user input specifying collection information during or after the creation of a visual media collection. As further indicated by FIG. 2A, the collector device 106 transmits the collection information to the social networking system 104.

As further shown in FIG. 2A, the social networking system 104 performs the act 208 of receiving user input related to the visual media collection. As indicated above, the social networking system 104 receives data or other indications from the collector device 106 indicating the selected visual media item(s), a request for generation of a visual media collection, selected contributor(s), and/or collection information.

Based on the data or other indications related to the visual media collection, the social networking system 104 performs the act 209 of generating a visual media collection comprising the visual media item. For example, the social networking system 104 may generate a collection identifier for a new visual media collection, associate a name for the visual media collection with the collection identifier, and assign or attach as metadata the collection identifier to one or both of the visual media item and a social networking post (or a collections post) from which the visual media item was selected. To associate such a post with the visual media collection, the social networking system 104 can, for example, associate a social-networking-post identifier or a collections-post identifier (respectively corresponding to the social networking post or the collections post from which the visual media item was selected) to a collection identifier for the visual media collection within the server(s) 102 or a database or represent connections within a social graph. In some embodiments, the social networking system 104 assigns or attaches as metadata the collection identifier to a newly received visual media item from the collector device 106 (e.g., an image newly captured by a camera) selected for inclusion in the visual media collection.

Alternatively, the social networking system 104 generates a node representing the visual media collection within a social graph and identifies (or generates) a node representing each visual media item and/or collections post assigned to the collections compilation. The social networking system 104 further connects the node representing the visual media collection to each visual media item assigned to the visual media collection with an edge indicating the visual media item and/or corresponding collections post is part of the visual media collection.

Additionally, in certain implementations, the social networking system 104 identifies the social networking accounts corresponding to the collection-posting user and selected contributor(s) and adds a permission indicator to the accounts granting permission to add, remove, and/or edit visual media items for the visual media collection according to permission settings selected by the collection-posting user. Based on the specified collection information, the social networking system 104 may additionally assign a name, description, associated user annotations (e.g. hashtags) to the visual media collection (e.g., within the server(s) 102 or a database or represent connections within a social graph). Further, the social networking system 104 can select a particular cover image for the visual media collection, such as by assigning an initially selected visual media item as the cover for the visual media collection.

Additionally, or in the alternative, the social networking system 104 generates the visual media collection by generating a copy of the visual media collection initially generated by the collector device 106. To make such a copy, in some embodiments, the social networking system 104 generates the visual media collection on the server(s) 102 based on social-networking-post identifiers, collection-post identifiers, image data for the selected visual media items(s), a name or description for the visual media collection, contributor(s), and/or permission settings. In one or more embodiments, the social networking system 104 designates the copy of the visual media collection on the server(s) 102 as a primary version or an authoritative version of the visual media collection.

As further shown in FIG. 2A, the social networking system 104 performs the act 210 of adding a visual media collection to a collections compilation. In some embodiments, the social networking system 104 generates a collections compilation for a collection-posting user's social networking account in the first instance if the social networking account lacks a collections compilation. For example, the social networking system 104 may generate a list of one or more visual media collections associated with a social networking account—or add the new visual media collection to an existing list—within the server(s) 102 or a database or represent connections within a social graph. In some cases, the social networking system 104 assigns or associates a collections-compilation-identifier with a new collections identifier representing the new visual media collection.

Alternatively, the social networking system 104 generates a node representing the collections compilation (or the social networking account) within a social graph and identifies (or generates) a node representing each visual media collection assigned to the collections compilation. The social networking system 104 further connects the node representing the collections compilation (or the social networking account) to each visual media collection assigned to the collections compilation with an edge indicating the visual media collection is part of the collections compilation.

Regardless of how the social networking system 104 generates a collections compilation, a collections compilation can include each visual media collection created via a collection-posting user's social networking account. In one or more embodiments, a collections compilation can also include each visual media collection to which a collection-posting user's social networking account has access. For example, a collections compilation may include a visual media collection to which a collection-posting user's social networking account has permission to add visual media items, even if the collection-posting user's social networking account did not request the generation of that visual media collection.

As further shown in FIG. 2A, the social networking system 104 performs the act 212 of providing the visual media collection for display. In one or more embodiments, providing the visual media collection for display can include providing the visual media collection in a graphical user interface for a user profile corresponding to the collection-posting user. As discussed below, the social networking system 104 can include the visual media collection on various graphical user interfaces in the social networking system 104, including one or more graphical user interfaces on the collection-posting user's user profile.

For example, the social networking system 104 can provide the visual media collection for display on a collection-posting user's user profile separately from social networking posts associated with the collection-posting user. The social networking system 104 can generate visual media collections based on different input than the input received when generating a social networking post. Further, the social networking system 104 can receive user input related to social networking posts via different graphical user interface(s) than the graphical user interface(s) utilized to receive user input related to visual media collections. Based on these differences, the social networking system 104 can provide the visual media collection for display to the collector device 106 and to the viewer device 110a.

By way of example, in one or more embodiments, the social networking system 104 can receive an indication of user input selecting a visual media item for inclusion in a social networking post via a specific graphical-user-interface field or a particular selectable graphical-user-interface button. For example, the social networking system 104 can receive an indication of a user selection of a graphical-user-interface button to create a visual media collection from a visual media item within a social networking feed or within a user profile. Consequently, the social networking system 104 can receive indications of different kinds of user interaction and/or user interaction at different graphical user interface elements when receiving a visual media item for inclusion in a social networking post or a visual media collection. The social networking system 104 can therefore generate a social networking post on a separate basis from that utilized to generate a visual media collection.

The social networking system 104 can further provide the visual media collection for display by generating one or more collections posts for the visual media collection. In one or more embodiments, a collections post is a post including a visual media item corresponding to a visual media collection. Additionally, or alternately, a collections post can include multiple visual media items from a visual media collection. In one or more embodiments, the social networking system 104 can provide these collections posts to collector device 106 and viewer device 110a for display within a social networking feed. The social networking system 104 can provide such collections posts for display within a social networking feed in addition to providing the visual media collection within a collection-posting user's user profile.

As shown in FIG. 2A, for example, the collector device 106 performs the act 214 of presenting the visual media item in a collections post corresponding to the visual media collection. For instance, in some embodiments, the collector device 106 generates a collections post comprising the visual media item selected for inclusion within a visual media collection and presents the collections post (among other collections posts or social networking posts) within a social networking feed for the collection-posting user. In some cases, the social networking feed constitutes a newsfeed of the collection-posting user.

As suggested above, the social networking system 104 can receive a follow request specific to a visual media collection and distribute visual media items and corresponding collections post according to such a follow request. As shown in FIG. 2A, for example, the viewer device 110a performs the act 218 of detecting user input requesting to follow the visual media collection. In some embodiments, the viewer device 110a detects a user selection of a follow option associated with the visual media collection. For example, in certain implementations, the viewer device 110a presents a representation of a visual media collection for the collection-posting user's social networking account within a graphical user interface comprising a follow option. The viewer device 110a detects a user selection of such a follow option and sends a follow request to the social networking system 104. As described below, the social networking system 104 can facilitate a follow function for visual media collections independently from a follow function for a social networking account generally.

As further shown in FIG. 2A, the viewer device 110a sends a follow request specific to the visual media collection to the social networking system 104. After the viewer device transmits the follow request, the social networking system 104 performs the act 220 of receiving the follow request. As noted above, the follow request may be specific to the visual media collection and request receipt of collections posts associated with the visual media collection.

Alternatively, the follow request may comprise a request to follow each of the visual media collections (and corresponding collections posts) of the collection-posting user associated with the collector device 106. To follow or receive each collections post from visual media collections of the collection-posting user's collections compilation, for example, the social networking system 104 optionally provides a "Follow Collections" option for display within a user profile. By contrast, in one or more embodiments, the social networking system 104 includes a selectable option to follow the posting compilation of a collection-posting user and the visual media collections corresponding to a collections compilation of that collection-posting user. For example, a collection-posting user's user profile can include a "Follow All" option. Upon receiving an indication of user selection of this option (e.g., via the viewer device 110a), the social networking system 104 can provide social networking posts from the collection-posting user's posting compilation and collections posts including visual media items from the visual media collections corresponding to the collection-posting user.

As shown in FIG. 2A, the social networking system 104 performs the act 222 of updating settings for a social networking feed based on the follow request. For instance, the social networking system 104 updates settings for the social networking feed of the social networking account associated with the viewer device 110a. The social networking system 104 can alter such settings to include within the corresponding social networking feed one or both of visual media items and collections posts including such visual media items from the visual media collection based on the follow request. Alternatively, the social networking system 104 alters such settings to optionally include visual media items from the visual media collection within a social networking feed associated with the viewer device 110a based on a relevance score or determination for a particular visual media item or corresponding collections post from the visual media collection.

As noted above, a social networking account associated with a viewer device 110a can follow a visual media collection without following social networking posts generally from the collection-posting user associated with the visual media collection. The social networking system 104 can include collections posts associated with the followed visual media collection in the viewing user's social networking feed. Further, the social networking system 104 can decline to include social networking posts in the viewing user's social networking feed based on the viewing user not following social networking posts from the collection-posting user generally. Consequently, the social networking system 104 can update settings for the social networking feed based on the follow request to include visual media items from the visual media collection without regard as to whether the social networking feed includes social networking posts from a particular user.

As shown in FIG. 2B, after updating a social networking feed's settings, the social networking system 104 performs the act 224 of providing the visual media item from the visual media collection in the social networking feed. For example, the social networking system 104 can include a collections post including the visual media item from the visual media collection in the social networking feed of the social networking account associated with the viewer device 110a. In some cases, the social networking system 104 transmits data representing the visual media item to the viewer device 110a as part of a collections post within a social networking feed.

Upon receiving the visual media item, the viewer device 110a performs the act 226 of presenting the visual media item from the visual media collection in the social networking feed. For example, the viewer device 110a can receive data representing a collections post from the social networking system 104 for presentation within a social networking feed and present the collections post a part of the social networking feed. In some embodiments, the collections post includes a visual indicator or tag indicating the collections post is part of the visual media collection. As suggested above, in some implementations, the collections post can include a caption, reaction options (e.g., a heart indicating approval), and/or options to add a comment or reply to a comment as part of the collections post.

As noted above, in certain implementations, the social networking system 104 generates and distributes visual media items from a visual media collection separate from social networking posts corresponding to a social networking account. As shown in FIG. 2B, for example, the collector device 106 performs the act 228 of detecting user input selecting a visual media item for a social networking post. The social networking post is separate from and not categorized as part of the visual media collection. In one or more embodiments, the social networking system 104 detects the user input selecting a visual media item via a graphical user interface and/or via an input field. In some cases, the collector device 106 presents a graphical user interface and/or an input field specific to a social networking post differing from a graphical user interface and/or an input field for a visual media collection.

As further shown in FIG. 2B, the collector device 106 transmits the visual media item and/or the user input associated with its selection to the social networking system 104. The social networking system 104 subsequently performs the act 230 of receiving user input related to the social networking post. For example, the social networking system 104 receives data or other indications from the collector device 106 indicating a selected visual media item, inputted text, inputted emoticons, etc. as part of the social networking post. The social networking system 104 further performs the act 232 of generating the social networking post. For example, the social networking system 104 generates a data packet representing the visual media item for the social networking post, text associated with the social networking post, and/or emoticons or graphics associated with the social networking post.

After or simultaneously with generating the social networking post, the social networking system 104 performs the act 234 of adding the social networking post to a posting compilation. For example, the social networking system 104 may add the social networking post to an existing list within the server(s) 102 or a database or represent connections within a social graph. In some cases, the social networking system 104 assigns or associates a posting-compilation-identifier with a new post identifier representing the new social networking post.

Alternatively, the social networking system 104 identifies (or generates) a node representing the posting compilation (or the social networking account) within a social graph and identifies (or generates) a node representing each social networking post assigned to the posting compilation. The social networking system 104 further connects the node representing the posting compilation (or the social networking account) to each social networking post assigned to the posting compilation with an edge indicating the social networking post is part of the posting compilation.

In one or more embodiments, the posting compilation comprises a set of social networking posts composed by a particular user corresponding to a social networking account. The social networking system 104 can accordingly add the social networking post to the posting compilation of the social networking account associated with the collector device 106 based on determining that the user input related to the social networking post was received from the collector device 106.

Further, the social networking system 104 can include a visual representation of the posting compilation in the user profile of the social networking account associated with the collector device 106. For example, the social networking system 104 can provide a visual representation of the posting compilation separately from a visual representation of the collections compilation corresponding to the social networking account.

Accordingly, a posting compilation and a collections compilation associated with the same social networking account can have different visual media items. The social networking system 104 can determine visual media items for a posting compilation and a collections compilation without regard for each other. Because a collection-posting user can select a visual media item from a social networking post for inclusion within a visual media collection, however, a posting compilation and a collections compilation can have a visual media collection (and, in some cases, a corresponding social networking post) in common. In some embodiments, a posting compilation and a collections compilation associated with the same social networking account can have any number of visual media items in common.

Upon adding the social networking post to a posting compilation, the social networking system 104 performs the step 236 of providing the social networking post for display via the social networking account of the collection-posting user. As discussed, the social networking system 104 can include a visual representation of the posting compilation in a user profile. Accordingly, the social networking system 104 can make visual media items included in social networking posts available to the viewer device 110a on a graphical user interface for the collection-posting user's user profile.

The social networking system 104 can provide various following options for social networking accounts with different privacy settings. For example, as described above, the social networking system 104 can provide a follow option to follow a social networking account's collections compilation, to follow an individual visual media collection, or to follow a social networking account's posting compilation and each visual media collection associated with the social networking account. In some embodiments, when the social networking account is public, the social networking system 104 can provide the social networking post to the viewer device 110a without necessitating the viewer device 110a to follow the social networking account associated with the collector device 106. When the social networking system 104 detects a request to follow a private social networking account, the social networking system 104 can provide the collector device 106 with an opportunity to approve or deny a follow request. In one or more embodiments, the social networking system 104 can provide information about the requesting social networking account and the type of follow request.

As further shown in FIG. 2B, the viewer device 110*a* performs the act 238 of presenting the social networking post. For example, the viewer device 110*a* can receive data representing the social networking post from the social networking system 104 for presentation within the social networking feed and present the social networking post a part of the social networking feed. In some embodiments, the social networking post includes a caption, reaction options (e.g., a heart indicating approval), and/or options to add a comment or reply to a comment as part of the social networking post.

In some cases, a viewer device does not receive or present the social networking post in a social networking feed of the social networking account associated with the viewer device. If the social networking account associated with the viewer device 110*n* does not follow the social networking account associated with the collector device 106, for example, the social networking system 104 can determine not to include the social networking post in a social networking feed associated with the viewer device 110*n*.

As noted above, in addition to granting co-users access or permissions to a visual media collection, the social networking system can integrate into (and identify visual media items from) visual media collections for search results. As shown in FIG. 2B, for example, the viewer device 110*a* performs the act 240 of detecting user input of a search query. In some cases, the viewer device 110*a* detects user input corresponding to a digital search of posts, user profiles, and other content within the social networking system 104 based on search terms. In certain implementations, a search query includes text, images, and other media. As but a few examples, the viewer device 110*a* can detect a search query from user input on a keyboard typing "how to style jeggings" into a search field or a digital image of a dog submitted for a reverse image search. The viewer device 110*a* can communicate this search query to the social networking system 104.

As suggested above, a search query can include one or more search terms. In one or more embodiments, a search term is a portion of a search query. For example, a search term can include a word and/or phrase in a search query. To take but one example, search terms in the search query "living room chair" can include "living," "room," "living room," and/or "chair."

As further shown in FIG. 2B, the social networking system 104 performs the act 242 of receiving the search query and the act 244 of determining that the search query relates to the visual media collection. The social networking system 104 can determine search results for a search query by determining that visual media items relate to one or more search terms from the search query (e.g., based on aspects of a visual media item within the visual media collection). Additionally, in one or more embodiments, the social networking system 104 utilizes location information and/or user information corresponding to a searching user to determine search results.

For example, the social networking system 104 determines classifiers for visual media items and utilizes those classifiers to identify visual media items for presentation within search results. In one or more embodiments, the social networking system 104 utilizes image or video analysis to determine classifiers for visual media items related to objects and/or scenes included in visual media items. In some cases, the social networking system 104 applies an ImageNet, ResNet (e.g., ResNet-50), or a Mask R-CNN to classify images. The social networking system 104 subsequently identifies a match or near match between classifiers and one or more search terms. For example, the social networking system 104 can assign a "lake" classifier to a visual media item including a scene of a lake. Based on this assignment, the social networking system 104 determines that the visual media item relates to the search term "lake."

As mentioned above, the social networking system 104 can also determine search results based in part on location data and/or user data corresponding to the searching user and his or her interests. In one or more embodiments, the social networking system 104 selects visual media items for inclusion in search results based on identifying user interaction with similar visual media items. However, the social networking system 104 can also provide search results when a searching user is not logged in to a social networking account. Further, the social networking system 104 can provide search results without access to location data for a searching user.

In some embodiments, the social networking system 104 can determine that a search query is related to the description or name of a visual media collection. For example, the social networking system 104 may determine that a search query relates to a visual media collection by identifying a match or near match between a search term and the description or the name of a visual media collection. Based on this determination, the social networking system 104 can determine that one or more visual media items included in the visual media collection relate to search terms from a search query. For example, based on determining that a visual media item is included in a visual media collection entitled "Rustic Living Rooms," the social networking system 104 can determine that visual media items included in the visual media collection are related to the search term "living room." Based at least in part on that determination, the social networking system 104 can include one or more visual media items from the visual media collection in search results for a search query including the search term "living room."

The social networking system 104 can also determine that a search query relates to a user annotation (e.g., a hashtag) associated with a visual media collection and/or a visual media item included in the visual media collection. For example, the social networking system 104 can determine that a visual media item (or corresponding collections post) includes a user annotation matching a search term in its caption and/or in an associated comment to the corresponding collections post. Additionally, the social networking system 104 can determine that a visual media collection is associated with a user annotation by determining that its collection-posting user utilized the user annotation in generation of the visual media collection, whether in a visual media collection description or in a field designated for user annotations. For example, the social networking system 104 can determine that a visual media collection is associated with the user annotation #vacation based on determining that the collection-posting user designated that user annotation in a hashtag field for the visual media collection. Based at least in part on this determination, the social networking system 104 can include one or more visual media items from the visual media collection in search results for a search query including the search term "vacation."

Additionally, or alternatively, the social networking system 104 can determine that a search term is related to a first visual media item based on identifying an association with a second visual media item. For example, the social networking system 104 can determine that a visual media item relates to a search term. Based on identifying the visual media item, the social networking system 104 can identify the visual media item as belonging to a visual media collection. The social networking system 104 can further identify that the visual media item is associated with other visual media items in its visual media collection. For example, the social networking system 104 can determine visual media items in the same visual media collection share a collection identifier. Based on one or more of these determinations, the social networking system 104 can determine that the search query relates to one or more other visual media items from the visual media collection.

Additionally, in one or more embodiments, the social networking system 104 can utilize visual media collections to identify relevant near matches between text related to a visual media item and a search term. The social networking system 104 can provide search results including user-generated content, which may include errors and typos in descriptions and/or comments. The social networking system 104 can determine that a visual media item includes a near match for a search term. For example, in some embodiments, the social networking system 104 maps a search term to commonly misspelled or mistyped versions of the search term from a database (e.g., relational database) or maps a misspelled or mistyped search term to a correctly spelled or correctly typed term in the database. Further, the social networking system 104 can determine that a visual media item is included in a visual media collection associated with one or more exact matches to a search term and/or additional near matches to a search term. In one or more embodiments, the social networking system 104 utilizes these determinations to determine that a visual media item includes a near match relevant to a search term.

For example, the social networking system 104 can receive a search query including the search term "bulldog." In this example, the social networking system 104 also determines that a visual media item includes the user annotation #buldog. The social networking system 104 can further determine that the visual media item is included in a visual media collection titled "Dog Breeds" that includes a different visual media item with the user annotation #bulldog. Based on one or both of these determinations, the social networking system 104 can determine that the visual media item including the user annotation #buldog is a relevant near match to the search term. The social networking system 104 accordingly includes the visual media item including the user annotation #buldog in the search results based on this determination.

Though the preceding discussion relates to utilizing determined associations between visual media items and visual media collections to determine search results, in one or more embodiments, the social networking system 104 utilizes these associations for a variety of processes. For example, in one or more embodiments, the social networking system 104 utilizes a determination that a visual media item is included in a visual media collection to determine visual media items for presentation in an exploration-based experience. For example, the social networking system 104 can determine content of interest to a user by identifying visual media items from visual media collections with names or descriptions including terms related to a client device's location, a search history for a social networking account, social networking posts or collections posts to which the user has previously reacted (e.g., "liked"), or other interests.

Accordingly, as shown in FIG. 2B, the social networking system 104 performs the act 246 of providing one or more visual media items from the visual media collection in search query results. In some embodiments, the social networking system 104 utilizes the determined associations with visual media items from the visual media collection to determine results to the search query. For example, the social networking system 104 can include a visual media item from a visual media collection based on determining that (i) the visual media collection has a name or description related to (or matching a term from) the search query, (ii) the search query includes terms related to or matching user annotations associated with the visual media collection, or (iii) the search query relates to or matches an additional visual media item part of the same visual media collection as another visual media item. Based on one or more such determinations, the social networking system provides search results including one or more visual media items from the visual media collection. As indicated by FIG. 2B, the social networking system 104 transmits the search results to the viewer device 110*a*.

Based on these received search query results, the viewer device 110*a* performs act 248 of presenting the one or more visual media items from the visual media collection in the search query results. For example, the viewer device 110*a* can present the search query results received from the social networking system 104 in a search graphical user interface. In one or more embodiments, the search graphical user interface can include the search query, one or more associated search terms, and visual media items as part of the search query results.

As discussed above, the social networking system 104 can provide a variety of graphical user interfaces to facilitate the generation and maintenance of visual media collections. FIGS. 3A-3G illustrate example embodiments of graphical user interfaces for the collector device 106. In particular, FIGS. 3A-3G illustrate example embodiments of various graphical user interfaces that a collector device can utilize in generating and/or maintaining a visual media collection. As an overview, FIGS. 3A-3G each depict the collector device 106 comprising the social networking application 108 for the social networking system 104. In some embodiments, the social networking application 108 comprises computer-executable instructions that cause the collector device 106 to perform certain actions depicted in FIGS. 3A-3G.

Rather than repeatedly describe the computer-executable instructions within the social networking application 108 as causing the collector device 106 to perform such actions, this disclosure primarily describes the collector device 106 or the social networking system 104 as performing the actions as a shorthand. This disclosure additionally refers to various user interactions indicated by FIGS. 3A-3G, such as when the collector device 106 detects a user selection of a visual media item. While the collector device 106 appears as a mobile device (e.g., a smartphone) in FIGS. 3A-3G, the collector device 106 may alternatively be any type of computing device, such as a desktop, laptop, or tablet, and may also detect any suitable user interaction, including, but not limited to, an audio input into a microphone, a keyboard input, a mouse click, a stylus interaction with a touch screen, or a touch gesture on a touch screen.

As mentioned above, the social networking system 104 can receive a visual media item for inclusion in a visual media collection through a variety of selections from the collector device 106. For instance, FIG. 3A illustrates the collector device 106 presenting a graphical user interface 300a within a screen 301. The collector device 106 presents a visual media item within a particular social networking post. In particular, the collector device 106 presents a digital image 302 as part of the social networking post. In one or more embodiments, the social networking system 104 provides the social networking post within the graphical user interface 300a in response to receiving an indication of a user selection of the social networking post within a social networking feed.

As further shown in FIG. 3A, the collector device 106 presents a posting-user-profile indicator 304 within the graphical user interface 300a. The posting-user-profile indicator 304 indicates the identity of the collection-posting user corresponding to the social networking post. As shown in FIG. 3A, the posting-user-profile indicator 304 includes a profile image for the collection-posting user and an identifier for the collection-posting user.

In addition to the posting-user-profile indicator 304, the graphical user interface 300a includes an options area 306. The options area 306 includes various icons for various options corresponding to the social networking post. For example, as shown in FIG. 3A, the options area 306 includes options to like the social networking post, comment on the social networking post, or share the social networking post. The options area 306 provides but a few options for a social networking post. An options area can include a variety of options, such as an option to view additional data for the social networking post, to report the social networking post, or to hide the social networking post.

As further shown in FIG. 3A, the collector device 106 presents a collection option 308 within the graphical user interface 300a. While FIG. 3A depicts the collection option 308 as a bookmark beneath the digital image 302, a collection option can be presented according to a variety of designs. For example, the social networking system 104 can present a collection option as a selectable option within a digital image that (upon user interaction) appears as an overlay of the digital image 302.

Upon detecting selection of the collection option 308, the collector device 106 transmits an indication to the social networking system 104 to add the digital image 302 to a visual media collection. Based on receiving the selected visual media item, the social networking system 104 can include the visual media item in a visual media collection. The collection option 308 provides an intuitive way for a collection-posting user to select a visual media item from the social networking post within the graphical user interface 300a. As indicated by FIG. 3A, the social networking system 104 can (i) add a visual media item from the social networking post in an existing visual media collection or (ii) generate a new visual media collection including a visual media item from a social networking post or a collections post.

The social networking system 104 can respond differently to different interactions with the collection option 308 (e.g., based on indications of interactions received from the collector device 106). For example, in response to a "tap" touch input at the collection option 308, the social networking system 104 includes the digital image 302 in a particular visual media collection. In one or more embodiments, based on a "tap" user input, the social networking system 104 includes the digital image 302 in a pre-selected visual media collection. In response to a particular type of user input at the collection option 308, the social networking system 104 can also include the digital image 302 in a most recently generated, used, or viewed visual media collection. For example, the social networking system 104 can include the digital image 302 in a most recently generated visual media collection in response to receiving a "long press" touch input at the collection option 308. In another example, the social networking system 104 can generate a new visual media collection including the digital image 302 in response to receiving an indication of a tap of the collection option 308.

In addition to the collection option 308, the social networking system 104 provides (and the collector device 106 presents) a collection-saving menu 309 within the graphical user interface 300a. In one or more embodiments, the social networking system 104 provides the collection-saving menu 309 in response to detecting another type of input at the collection option 308. For example, in one or more embodiments, the collector device 106 presents the collection-saving menu 309 in response to detecting a long press of the collection option 308. As explained further below, the collector device 106 can present a collection-saving menu in a variety of graphical user interfaces in response to detecting user input reflecting an intent to add a visual media item to a visual media collection or generate a visual media collection including a visual media item.

As depicted in FIG. 3A, the collector device 106 presents the collection-saving menu 309 as a pop-up element at the bottom of the graphical user interface 300a. However, the collector device 106 can present a collection-saving menu in accordance with a variety of designs that communicate that selection of a visual media collection will cause the social networking system 104 to add a visual media item to the selected visual media collection. In some embodiments, the collection-saving menu 309 includes a scroll feature that (upon detecting user interaction with the scroll feature) causes the collector device 106 to present additional visual media collections associated with the social networking account of the collection-posting user.

Figure 3D:
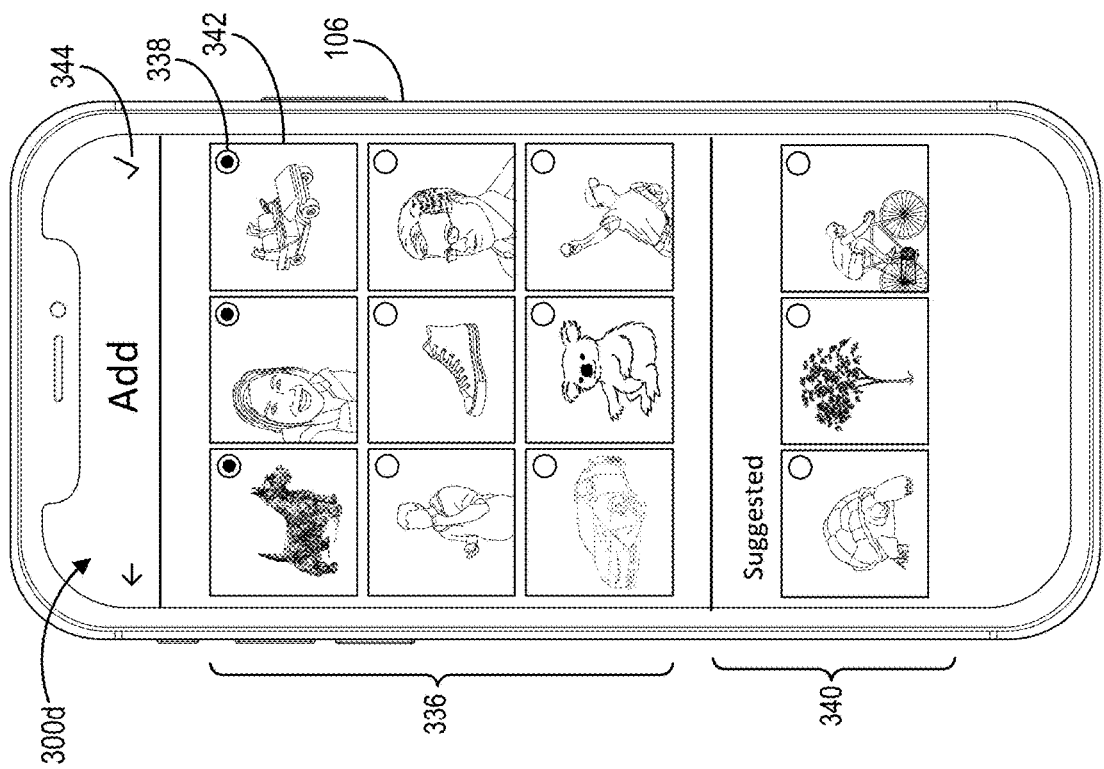

As further shown in FIG. 3A, the collection-saving menu 309 includes thumbnail images representing existing visual media collections associated with the collection-posting user's social networking account. The collection-saving menu 309 also includes a new-collection option 310 to generate a new visual media collection. In one or more embodiments, upon detecting user interaction with a thumbnail image representing an existing visual media collection within the collection-saving menu 309, the collector device 106 adds the digital image 302 to the selected visual media collection and sends an indication to the social networking system 104 to add the digital image 302 to the selected visual media collection. In response to detecting selection of the new-collection option 310, the collector device 106 generates a new visual media collection including the digital image 302. As discussed below with regard to FIGS. 3C-3D, after selection of the new-collection option 310, the collector device 106 can proceed to collect information concerning the new visual media collection.

As described above, the collector device 106 detects (and the social networking system 104 receives an indication of) a user selection of a visual media item for inclusion in a visual media collection from a social networking post corresponding to a posting compilation. The social networking post and the posting compilation may correspond to a social networking account of the collection-posting user or to a co-user of the social networking system 104. Additionally, or alternatively, the collector device 106 detects (and the social networking system 104 receives an indication of) a user selection of a visual media item for inclusion in a visual media collection from a collections post corresponding to a collections compilation. Similar to the previous example, the collections post and the collections compilation may correspond to a social networking account of the collection-posting user or to a co-user of the social networking system 104.

Accordingly, the social networking system 104 can facilitate generation or maintenance of a visual media collection from a social networking feed or a user profile. Further, in one or more embodiments, the social networking system 104 also facilitates generation and maintenance of visual media collections based on receiving indications of user selections from the collector device 106. FIG. 3B illustrates the collector device 106 presenting visual-media-collection icons 312 within a graphical user interface 300b. As shown in FIG. 3B, the collector device 106 further presents the graphical user interface 300b including a privacy icon 314 indicating a private visual media collection, a collaboration icon 315 indicating a collaborative visual media collection, an aggregate-collections icon 316 representing a visual media collection of all visual media items (and corresponding collections posts) corresponding to a collections compilation, and a purchasable-items-collection icon 318 representing a visual medial collection comprising visual media items indicating purchasable items.

As further shown in FIG. 3B, the collector device 106 presents the visual-media-collection icons 312 in a grid format. More specifically, the social networking system 104 provides (and the collector device 106 presents) a cover image and a name for each visual media collection represented by the visual-media-collection icons 312. But the collector device 106 can present a listing or other representation of a collection-posting user's visual media collections in accordance with a variety of designs. For example, the collector device 106 can present visual representations of each visual media collection represented by the visual-media-collection icons 312 including a user annotation corresponding to each visual media collection.

As indicated by FIG. 3B, the social networking system 104 can generate "public" visual media collections that are viewable from the collection-posting user's user profile or other graphical user interface. Additionally, in one or more embodiments, the social networking system 104 generates "private" visual media collections that are viewable only by the collection-posting user. As shown in FIG. 3B, for example, the social networking system 104 indicates a private visual media collection using the privacy icon 314. The collector device 106 presents the privacy icon 314 as a padlock icon near the name of the visual media collection. But a privacy icon can be presented in accordance with a variety of designs that communicate to a collection-posting user that the indicated visual media collection is not viewable by co-users of the social networking system 104.

Figure 3C:
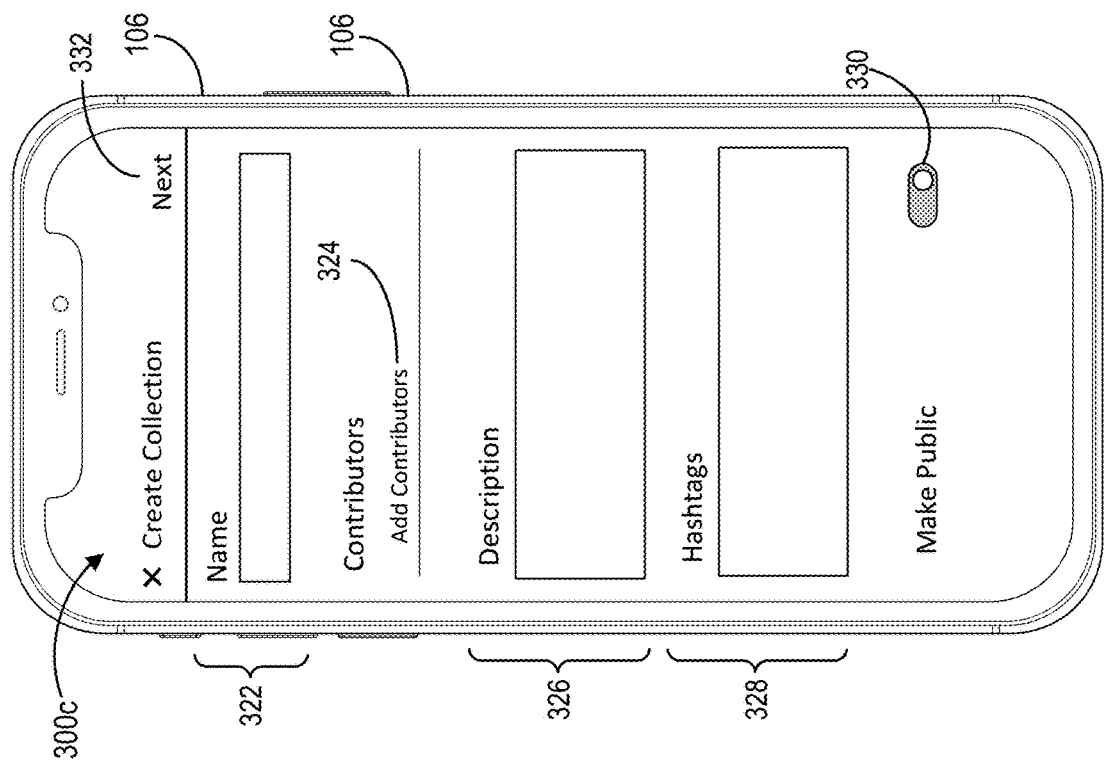

As will be shown with regard to FIG. 3C, the social networking system 104 can prompt a collection-posting user at creation of a visual media collection to determine whether the visual media collection will be public or private. The social networking system 104 accordingly provides the visual-media-collection icons 312 in accordance with the user-indicated-privacy settings. Based on detecting a selection of the visual-media-collection icon corresponding to the privacy icon 314, the collector device 106 presents visual media items from a private visual media collection. But the social networking system 104 does not provide a representation of the private visual media collection for display within a viewer device.

As indicated by FIG. 3B, the social networking system 104 generates a collaborative visual media collection represented by the collaboration icon 315. Although the collector device 106 presents the collaboration icon 315 as an outline of one or more faces or bodies in FIG. 3B, a collaboration icon may include other suitable representations or icons to indicate collaboration. The collector device 106 presents the collaboration icon 315 alongside the name of the visual media collection. As described below, the social networking system 104 can generate such a collaborative visual media collection by granting designated contributors access to add or otherwise modify visual media items in a visual media collection.

As also indicated by FIG. 3B, the social networking system 104 generates an aggregate-visual-media collection represented by the aggregate-collections icon 316, where the aggregate-visual-media collection includes all visual media items collected within a visual media collection by a particular collection-posting user. Accordingly, in one or more embodiments, when the social networking system 104 adds a new visual media item to a visual media collection, the social networking system 104 also adds the visual media item to the aggregate-visual-media collection. Thus, the aggregate-visual-media collection represented by the aggregate-collections icon 316 includes each visual media item from each other visual media collection associated with a particular social networking account.

In one or more embodiments, the social networking system 104 excludes visual media items in private collections from an aggregate-visual-media collection—unless the visual media item or corresponding collections post are otherwise available to co-users in another visual media collection. Because an aggregate-visual-media collection may be accessible by co-users, the social networking system 104 optionally excludes visual media items within private visual media collections from the aggregate-visual-media collection. For example, in one or more embodiments, the social networking system 104 adds a new visual media item to a private visual media collection. Based on identifying the addition to a private visual media collection, the social networking system 104 determines not to add the visual media item to the aggregate-visual-media collection.

Additionally, in one or more embodiments, the social networking system 104 can determine not to add a duplicate visual media item or corresponding collections post to an aggregate-visual-media collection. To illustrate, a collection-posting user can select the same visual media item for inclusion in multiple visual media collections. However, in some situations it may be undesirable to include multiple instances of the same visual media item in the aggregate-visual-media collection. Thus, in one or more embodiments, the social networking system 104 determines not to add a visual media item to the aggregate-visual-media collection based on identifying that the visual media item is already included in the aggregate-visual-media collection.

While FIG. 3B depicts the aggregate-visual-media collection represented by the aggregate-collections icon 316 as accessible to co-users (e.g., followers) or public, the social networking system 104 can generate the aggregate-visual-media collection as a private collection. As discussed below, the collector device 106 can modify settings for a visual media collection after generation based on selections by the collection-posting user. Thus, the collection-posting user can designate the aggregate-visual-media collection as private after generation. Similarly, while FIG. 3B depicts the aggregate-visual-media collection represented by the aggregate-collections icon 316 with the title "All Collected," the social networking system 104 can generate an aggregate-collections icon with another title. Further, the social networking system 104 can modify the name or cover image of an aggregate-collections icon based on receiving user input from the collector device 106 changing the name or cover image for the aggregate-visual-media collection.

As also shown in FIG. 3B, the collector device 106 presents a purchasable-items-collection icon 318. As discussed below, in one or more embodiments, the social networking system 104 can generate a purchasable-items collection comprising visual media items portraying or otherwise indicating purchasable items (e.g., clothes, sporting goods, computing devices). In one or more embodiments, the social networking system 104 identifies items for inclusion in a purchasable-items collection by receiving an indication of a user selection of a visual media item (or corresponding collections post) from the collector device 106. The social networking system 104 can also automatically identify visual media items for inclusion in a purchasable-items collection by identifying a hyperlink to a website or mobile application selling items, such as a website or mobile application selling an item portrayed or otherwise indicated by the visual media item.

As further shown in FIG. 3B, the collector device 106 presents a new-collection option 319 to generate a new visual media collection. FIG. 3B shows the new-collection option 319 as a plus icon in the graphical user interface 300b. But the social networking system 104 can provide a new-collection option in accordance with a variety of designs and styles that communicate to a collection-posting user that selection of a new-collection option initiates the process of generating a new visual media collection.

As indicated by FIGS. 3A and 3B, the social networking system 104 can initiate generating new visual media collections or add visual media items to an existing visual media collection based on receiving indications of user selections from options corresponding to a social networking post, a collections post, or a display of visual-media-collection icons. Whether in response to selection of the new-collection option 319 or in response to an interaction with the collection-saving menu 309, the social networking system 104 can receive an indication of user input from the collector device 106 requesting generation of a new visual media collection. Upon receiving an indication of such a selection, the social networking system 104 initiates the process of generating a new visual media collection.

In accordance with one or more embodiments, FIG. 3C illustrates the collector device 106 presenting fields and settings to generate and customize a new visual media collection within a graphical user interface 300c. While FIG. 3C depicts various fields and settings corresponding to a new visual media collection, in one or more embodiments, the social networking system 104 can provide some or all of these fields and settings depicted in FIG. 3C.

As shown in FIG. 3C, the collector device 106 presents a collection-name field 322. Upon detecting user input in the collection-name field 322 indicating a name for the new visual media collection, the collector device 106 sends the name to the social networking system 104 to associate with the new visual media collection. In one or more embodiments, if the social networking system 104 determines that the user did not enter a name for the new visual media collection, the social networking system 104 automatically generates a name for the visual media collection. For example, the social networking system 104 can generate a name based on the date of creation of the visual media collection. Additionally, in one or more embodiments, the social networking system 104 automatically determines a name for the visual media collection based on terms in comments or captions associated with social networking posts or collections posts from which the visual media items are selection for inclusion within the new visual media collection.

As discussed above, the social networking system 104 can generate and maintain visual media collections with multiple contributors. As shown in FIG. 3C, the collector device 106 presents a contributors field 324 within the graphical user interface 300c. In some embodiments, the collector device 106 detects user input selecting one or more contributors for the visual media collection within the contributors field 324. To illustrate, the collector device 106 detects user input within the contributors field 324 selecting one or more co-users to be contributors to the visual media collection. In one or more embodiments, the collector device 106 presents the contributors field 324 including a listing of any contributors already selected for the visual media collection.

Based on detecting an entry of a name or user handle within (or other user interaction with) the contributors field 324, in one or more embodiments, the collector device 106 presents permission options for contributors to the visual media collection. For example, the collector device 106 can present permission options for a particular contributor to add visual media items to the visual media collection, edit settings for the visual media collection, remove visual media items from the visual media collection, and/or designate additional contributors for the visual media collection. Accordingly, the social networking system 104 can provide the collector device 106 and collection-posting user precise tools to control over access to the visual media collection.

Based on receiving one or both of added contributors and selected permission options, the social networking system 104 grants the selected contributors access to the visual media collection in accordance with the input received within the contributors field 324. For example, the social networking system 104 grants one or more selected contributors access to add visual media items to the visual media collection, edit settings for the visual media collection, remove visual media items from the visual media collection, and/or designate additional contributors for the visual media collection.

As further shown in FIG. 3C, the collector device 106 presents a description field 326 and a user-annotation field 328 within the graphical user interface 300c. As discussed above, the social networking system 104 can utilize text and user annotations (e.g., hashtags) associated with a visual media item or visual media collection to inform search results and explore functionality within the social networking system 104. In one or more embodiments, the social networking system 104 can treat any text received in the description field 326 as associated with the visual media collection (or constituent visual media items) and can utilize the text accordingly. Similarly, the social networking system 104 can treat any user annotations received in the user-annotation field 328 as associated with the visual media collection (or constituent visual media items) and can utilize the user annotations accordingly.

In addition to the description field 326 and the user-annotation field 328, the collector device 106 presents a privacy toggle 330 within the graphical user interface 300c. As shown in FIG. 3C, the privacy toggle 330 constitutes a toggle option, but other selectable options or tools can be used. Upon receiving an indication of user selection of the privacy toggle 330 from the collector device 106, the social networking system 104 modifies the privacy settings of the visual media collection in accordance with the updated state of the privacy toggle 330 (e.g., by designating the visual media collection public or private). Accordingly, the social networking system 104 can generate either public visual media collections available to selected co-users (or all co-users) or private visual media collections available to the collection-posting user associated with the collector device 106 based on user input. As described below, the social networking system 104 can allow a collection-posting user to modify privacy settings after generation of the visual media collection.

The collector device 106 also presents a next option 332. Upon detecting a selection of the next option 332, the collector device 106 proceeds to the next step of generating a new visual media collection. In one or more embodiments, the collector device 106 proceeds to generate the visual media collection with any previously selected visual media items. For example, in response to detecting a selection of a visual media item and the new-collection option 310 depicted in FIG. 3A, the collector device 106 presents the fields and settings within the graphical user interface 300c. After detecting a user selection of the next option 332 depicted in FIG. 3C, the collector device 106 generates the new visual media collection comprising the digital image 302 selected from the social networking post shown in FIG. 3A.

By contrast, in some embodiments, the collector device 106 presents potential visual media items for inclusion in a visual media collection after detecting a user selection of the next option 332 in FIG. 3C. In accordance with one or more embodiments, FIG. 3D illustrates an example of the collector device 106 presenting various potential visual media items for inclusion in a visual media collection. In particular, the collector device 106 presents potential-visual-media items 336 within a graphical user interface 300d.

As indicated by FIG. 3D, the social networking system 104 selects a variety of visual media items for inclusion in the potential-visual-media items 336. To identify the potential-visual-media items 336, for example, the social networking system 104 can select visual media items from existing visual media collections corresponding to the collection-posting user's social networking account. Additionally, or alternatively, the social networking system 104 can select visual media items from existing social networking posts corresponding to the collection-posting user's social networking account.

As further shown in FIG. 3D, the collector device 106 presents a selection option corresponding to each visual media item within the potential-visual-media items 336. For example, the collector device 106 presents a selection option 338 corresponding to a potential-visual-media item 342 among the potential-visual-media items 336. In response to detecting a user selection of the selection option 338, the collector device 106 selects or de-selects the potential-visual-media item 342 for inclusion within the visual media collection.

Additionally, or alternatively, the collector device 106 presents, among the potential-visual-media items 336, any visual media item previously selected for inclusion in the visual media collection. For example, the collector device 106 includes the digital image 302 selected from the social networking post depicted in FIG. 3A within the potential-visual-media items 336 depicted in FIG. 3D. Based on detecting a selection of the digital image 302 for inclusion within a new visual media collection, the collector device 106 presents a selection option corresponding to the digital image 302 as already selected within the graphical user interface 300d.

As further shown in FIG. 3D, the collector device 106 presents suggested-visual-media items 340 within the graphical user interface 300d. In one or more embodiments, the social networking system 104 selects (and the collector device 106 presents) visual media items as part of the suggested-visual-media items 340 from the same source as a previously selected visual media item. For example, the social networking system 104 can select (and the collector device 106 can include) visual media items within the suggested-visual-media items 340 from (i) the same social networking account as a previously selected visual media item or (ii) the same visual media collection as the previously selected visual media item. After detecting a selection of a visual media item from a visual media collection corresponding to a different social networking account, for instance, the collector device 106 selects other visual media items from the same visual media collection for inclusion in the suggested-visual-media items 340.

Additionally, or alternatively, the social networking system 104 selects (and the collector device 106 presents) visual media items within the suggested-visual-media items 340 based on user profile information corresponding to the collection-posting user's social networking account, social networking posts or collections posts to which the collection-posting user has previously reacted (e.g., "liked"), and/or determined behavior of other collection-posting users. For example, the social networking system 104 selects digital images related to a subject matter with which the collection-posting user frequently interacts (e.g., comments). In another example, the social networking system 104 identifies digital images or videos with the same or a similar user annotation to a user annotation included in a previously selected visual media item.

As further shown in FIG. 3D, the collector device 106 presents an acceptance option 344 within the graphical user interface 300d. As depicted in FIG. 3D, the collector device 106 presents the acceptance option 344 as a check-mark icon in the graphical user interface 300d. But the collector device 106 can present an acceptance option in accordance with a variety of styles and designs. Upon detecting a user selection of the acceptance option 344, the collector device 106 generates a new visual media collection including each selected visual media items from the potential-visual-media items 336 and the suggested-visual-media items 340. In some embodiments, the collector device 106 further transmits an indication of the selected visual media items to the social networking system 104 to generate a copy or version of the new visual media collection (e.g., a primary copy of the visual media collection).

In one or more embodiments, the collector device 106 presents the potential-visual-media items 336 and the suggested-visual-media items 340 within the graphical user interface 300d based on detecting a selection of an option to add a visual media item to an existing visual media collection. In such a situation, the social networking system 104 can select (and the collector device 106 present) visual media items already included in the visual media collection within either the potential-visual-media items 336 or the suggested-visual-media items 340. Upon detecting a user selection of the acceptance option 344, the collector device 106 similarly includes or maintains previously selected visual media items that remain selected within the existing visual media collection. In some embodiments, the collector device 106 further transmits an indication to the social networking system 104 to include or maintain the previously selected visual media items that remain selected within the existing visual media collection (e.g., a primary copy of the existing visual media collection).

Figure 3F:
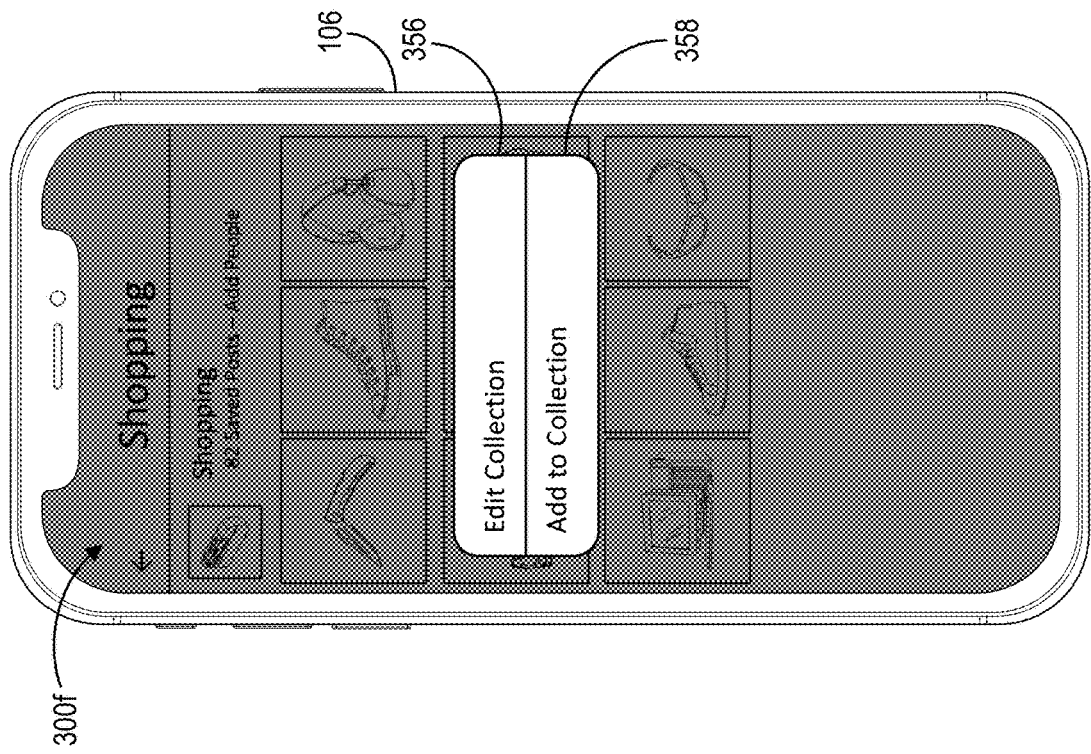
Figure 3E:
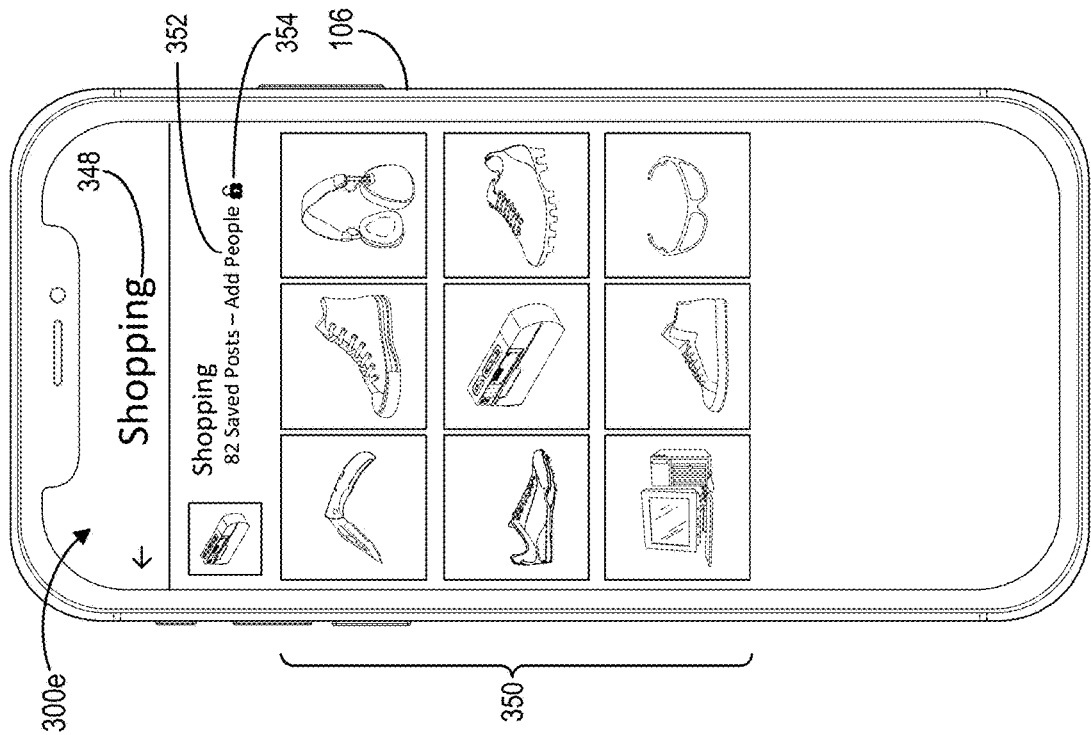

Turning to FIG. 3E, as discussed above, the social networking system 104 can provide a visual media collection for display within a graphical user interface of the collector device 106. FIG. 3E illustrates an example of the collector device 106 providing a visual media collection within a graphical user interface 300e. Specifically, FIG. 3E illustrates the collector device 106 presenting a purchasable-items collection comprising visual media items portraying or otherwise indicating products, services, or other items available for purchase.

As shown in FIG. 3E, the collector device 106 presents a title 348 for the purchasable-items collection. In one or more embodiments, a title is the name given to a visual media collection by a collection-posting user at generation. Alternatively, the social networking system 104 can automatically generate a title for the visual media collection.

As further shown in FIG. 3E, the collector device 106 presents the visual media items 350 as part of the purchasable-item collection. FIG. 3E illustrates the visual media items 350 in a grid arrangement, but the collector device 106 can present the visual media items 350 according to a variety of designs. For example, the collector device 106 can present visual media items from a visual media collection in a list, as layered image icons, or as thumbnail images of corresponding collections posts. In one or more embodiments, the social networking system 104 provides the visual media items 350 from the purchasable-item collection within the graphical user interface 300e in accordance with settings associated with the collection-posting user or with the particular purchasable-items collection (e.g., a specified order of visual media items by time added or in order of most viewed visual media items).

To identify one or more of the visual media items 350, in some embodiments, the collector device 106 detects a user selection of a visual media item for inclusion within the purchasable-items collections. Additionally, or alternatively, in one or more embodiments, the social networking system 104 identifies visual media items indicating items available for purchase for inclusion in the purchasable-items collections.

For example, in one or more embodiments, the social networking system 104 identifies that a visual media item posted in a social networking post or a collections post is available for purchase. To make such an identification, the social networking system 104 optionally determines that a social networking account or a web site advertising or selling items comprises (or is a source of) the visual media item. In some such cases, the social networking system 104 maintains a list or collection of social networking accounts, websites, or universal resource locators ("URLs") corresponding to items for purchase. Based on identifying an image or other visual media item in such a social networking account, website, or URL, the social networking system 104 can include the visual media item within the visual media items 350 as part of the purchasable-items collection (e.g., based on confirmation from the collection-posting user).

As another example, in some embodiments, the social networking system 104 identifies that a visual media item corresponds to a link to a social networking account, a website, or a URL advertising or selling items. In one or more embodiments, a social networking system 104 identifies the link in a visual media item's description, caption, or comment of the visual media item. Based on that identification, the social networking system 104 determines that the visual media item is related to an item (or items) available for purchase. Based on identifying such a link, the social networking system 104 can include the visual media item within the visual media items 350 as part of the purchasable-items collection (e.g., based on confirmation from the collection-posting user).

Additionally, or alternatively, the social networking system 104 sends a confirmation request to the collector device 106 prompting the collection-posting user to add the visual media item to a purchasable-items collection or confirm the visual media item indicates a purchasable item. In some cases, the social networking system 104 sends such a confirmation request after adding a visual media item to the purchasable-items collection. The social networking system 104 can also send such a confirmation request after selection of a visual media item for inclusion within one or more visual media collections. For example, the social networking system 104 can send an indication to the collector device 106 to include the purchasable-items collection within a collection-saving menu (e.g., as shown in FIG. 3A) upon determining the selected visual media item portrays or otherwise indicates a purchasable item.

As further shown in FIG. 3E, the collector device 106 also presents a contributors option 352 within the graphical user interface 300d. In particular, the collector device 106 presents the contributors option 352 within or as part of the text "Add People." Upon detecting selection of the contributors option 352, the collector device 106 facilitates editing and/or generation of permissions for contributors to the visual media collection. Based on receiving indications of one or both of selected contributors and selected permissions from the collector device 106, the social networking system 104 grants the selected contributors access to the purchasable-items collection in accordance with the input received (e.g., within a contributors field).

Additionally, as shown in FIG. 3E, the collector device 106 presents a privacy icon 352 within the graphical user interface 300d. In particular, the collector device 106 presents the privacy icon 352 as an unlocked padlock icon to reflect that the displayed visual media collection is public or at least not private. In one or more embodiments, the collector device 106 can present a privacy icon as a locked padlock icon when the displayed visual media collection is set to private. Upon receiving an indication of a user selection of the privacy icon 352 from the collector device 106, the social networking system 104 can modify privacy settings for the displayed visual media collection. For example, the social networking system 104 can toggle the privacy of the visual media collection or can provide, for display on the client device 106, a menu including additional privacy options for the visual media collection. Such privacy icons can also be presented in accordance with a variety of designs communicating a privacy state and/or a relationship to privacy settings for the visual media collection.

As discussed above, in some embodiments, the social networking system 104 facilitates editing of a visual media collection. Based on detecting a user interaction with a graphical user interface comprising a visual media collection, for example, the collector device 106 can present a graphical user interface comprising an edit-collection option or an add-to-collection option. FIG. 3F illustrates an example of such options. Based on detecting a long press of (or other designated user interaction with) the graphical user interface 300e shown in FIG. 3E, for example, the collector device 106 presents an edit-collection option 356 and an add-to-collection option 358 within a graphical user interface 300f. As depicted in FIG. 3F, the collector device 106 presents the edit-collection option 356 and the add-to-collection option 358 as overlays. But the social networking system 104 can likewise use other icons or graphical elements to represent an edit-collection option or an add-to-collection option.

Upon detecting a user selection of the add-to-collection option 358, the collector device 106 presents a graphical user interface for adding or deleting visual media items from a visual media collection. For example, in some embodiments, the social networking system 104 provides a graphical user interface for adjusting visual media items (such as the graphical user interface 300d depicted in FIG. 3D) for display within the collector device 106 upon receiving an indication of a user selection of the add-to-collection option 358 from the collector device 106. In some such embodiments, the social networking system 104 further suggests visual media items for the visual media collection based on the visual media items presently included in the visual media collection (such as part of the suggested-visual-media items 340 depicted in FIG. 3D).

Figure 3G:
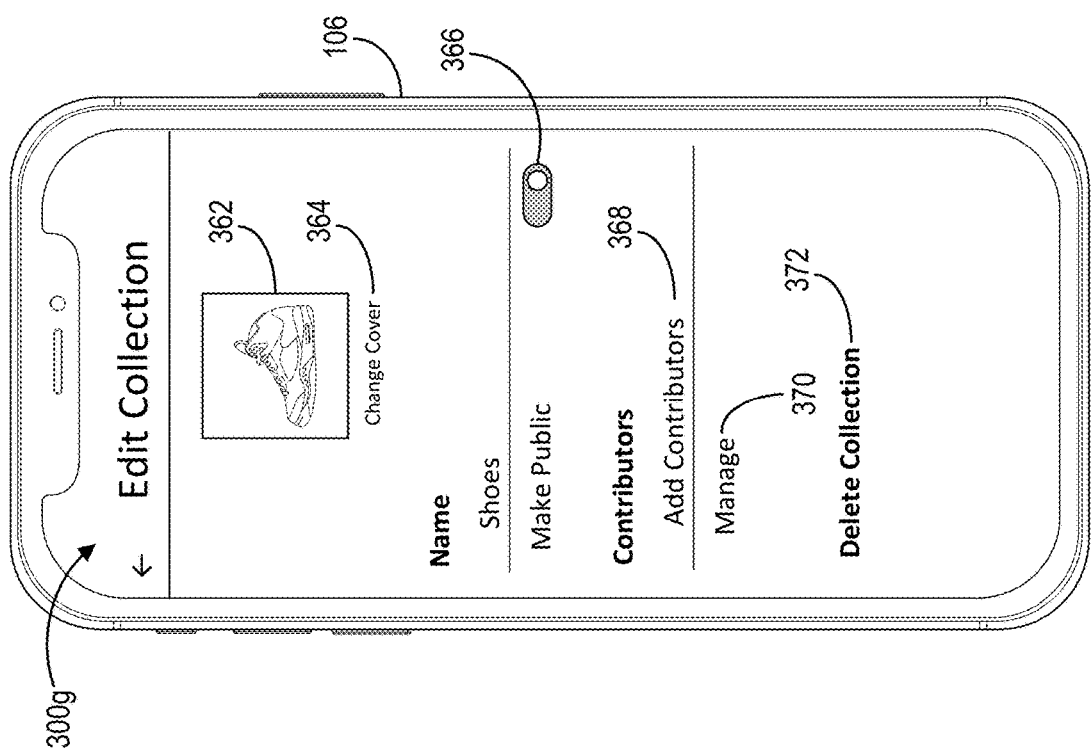

Upon detecting a user selection of the edit-collection option 356, the collector device 106 presents a graphical user interface for editing information corresponding to a visual media collection. FIG. 3G illustrates an example of various options for editing information corresponding to a visual media collection. In particular, FIG. 3G illustrates the collector device 106 presenting information about a particular visual media collection and various options for editing the visual media collection within a graphical user interface 300g.

As shown in FIG. 3G, for example, the collector device 106 presents a cover image 362 and a change-cover option 364 within the graphical user interface 300g. The cover image 362 comprises a digital image representing a visual media item included in the visual media collection. Upon detecting a user selection of the change-cover option 364, the collector device 106 presents one or more visual media items as potential replacement cover images for the visual media collection. In one or more embodiments, the collector device 106 presents the visual media items included within the visual media collection as potential replacement cover images.

As further shown in FIG. 3G, the collector device 106 presents a privacy toggle 366 within the graphical user interface 300g. Similarly to the privacy toggle 330 shown in FIG. 3C, the privacy toggle 366 constitutes a toggle option. Upon receiving an indication of user selection of the privacy toggle 366 from the collector device 106, the social networking system 104 modifies the privacy settings of the visual media collection in accordance with the updated state of the privacy toggle 366 (e.g., by designating the visual media collection public or private).

In addition to the privacy toggle 366, the collector device 106 also presents a contributors field 368 and a manage-contributors option 370 within the graphical user interface 300g. Upon detecting user input within the contributors field 368 selecting one or more co-users as contributors, for example, the collector device 106 adds such selected contributors to the visual media collection consistent with any designated permission settings. Upon detecting a user selection of the manage-contributors option 370, the collector device 106 facilitates changes to and/or removal of contributors to the visual media collection. For example, in some embodiments, the collector device 106 presents permission settings to change or remove permissions for existing contributors based on detecting a user selection of the manage-contributors option 370. Based on receiving indications to add contributors to a visual media collection with permission settings, the social networking system 104 generates a collaborative visual media collection.

As further shown in FIG. 3G, the collector device 106 also presents a delete option 372 within the graphical user interface 300g. Based on detecting a user selection of the delete option 372, the collector device 106 removes the visual media collection from the social networking account. In some embodiments, the collector device 106 further sends an indication to the social networking system 104 to remove the visual media collection (or a copy or version of the visual media collection) from the social networking account.

As discussed above, the social networking system 104 can provide visual media collections associated with a collection-posting user for display to co-users of the social networking system 104. For instance, the social networking system 104 can provide visual media collections for display on a collection-posting user's user profile. As an overview, FIGS. 4A-4D depict graphical user interfaces comprising a collection-posting user's user profile, the collection-posting user's visual media collections, a follow option, and a collections post. Further, FIGS. 4A-4D each depict the viewer device 110a comprising the social networking application 112a for the social networking system 104. In some embodiments, the social networking application 112a comprises computer-executable instructions that cause the viewer device 110a to perform certain actions depicted in FIGS. 4A-4D.

Rather than repeatedly describe the computer-executable instructions within the social networking application 112a as causing the viewer device 110a to perform such actions, this disclosure primarily describes the viewer device 110a or the social networking system 104 as performing the actions as a shorthand. This disclosure additionally refers to various user interactions indicated by FIGS. 4A-4D, such as when the viewer device 110a detects a user selection of a graphical-user-interface element. While the viewer device 110a appears as a mobile device (e.g., smartphone) in FIGS. 4A-3D, the viewer device 110a may alternatively be any type of computing device, such as a desktop, laptop, or tablet, and may also detect any suitable user interaction, including, but not limited to, an audio input into a microphone, a keyboard input, a mouse click, a stylus interaction with a touch screen, or a touch gesture on a touch screen.

Figure 4B:
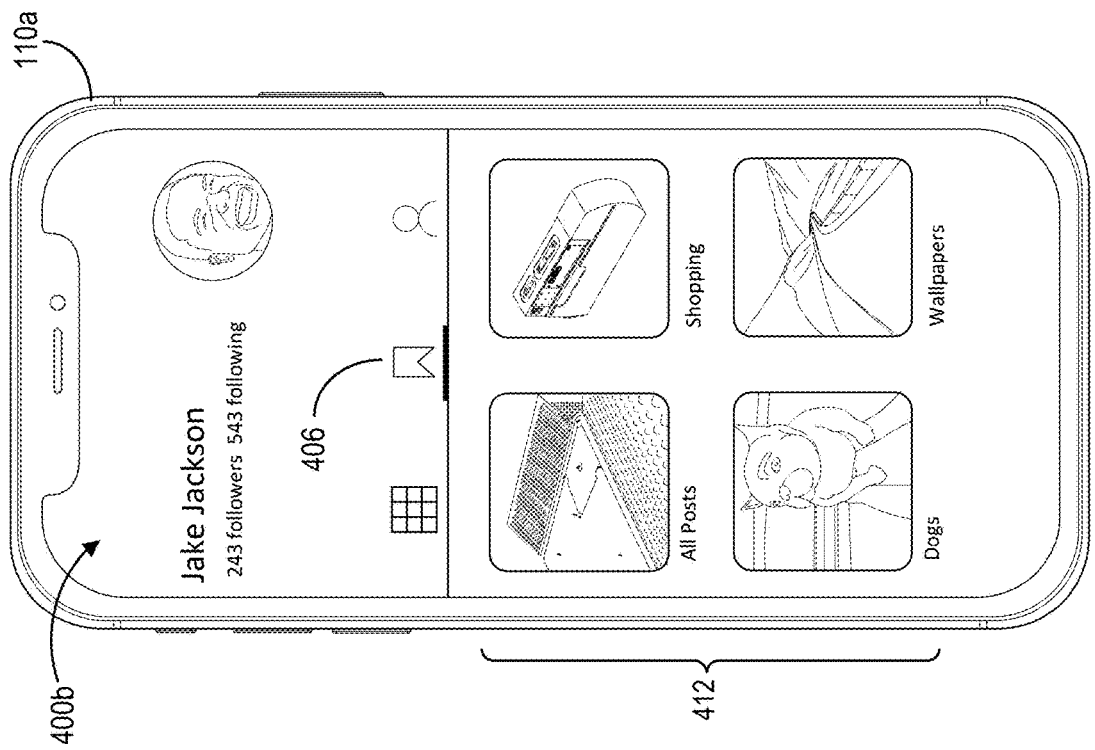
FIGS. 4A-4D illustrate example graphical user interfaces for a viewer device for viewing and following visual media collections in accordance with one or more embodiments.
Figure 4A:
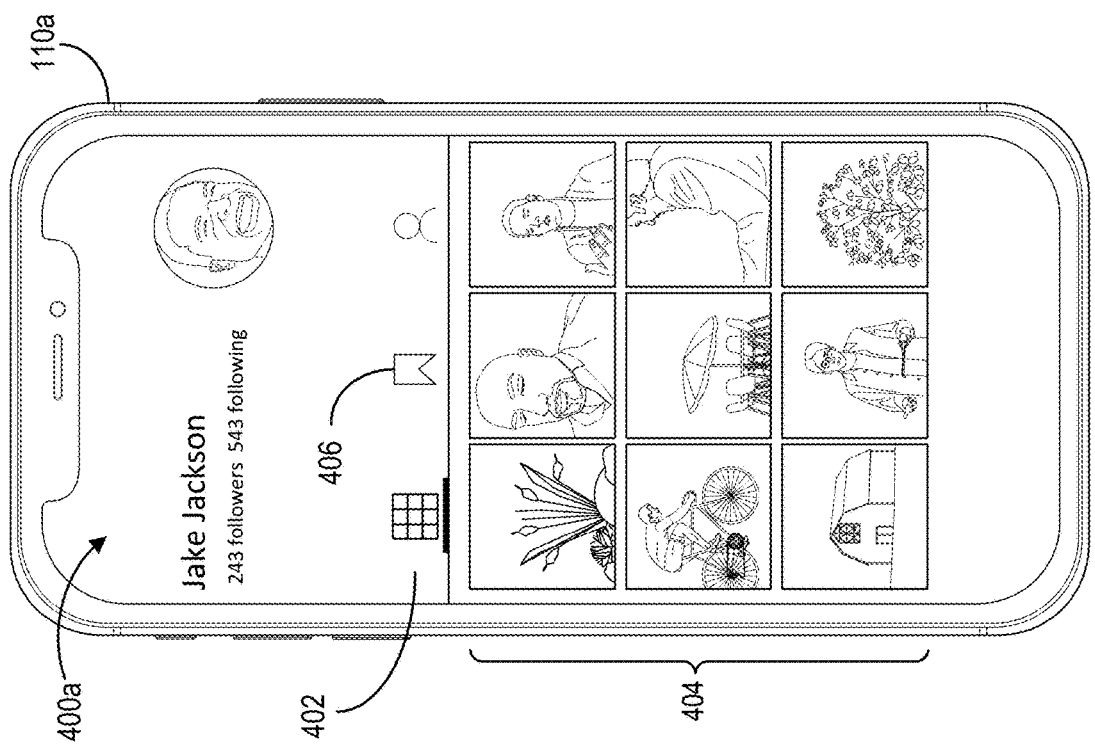

FIG. 4A illustrates the viewer device 110a presenting a visual representation of a posting compilation on a collection-posting user's user profile. In particular, the social networking system 104 provides the collection-posting user's social networking posts for display on the viewer device 110a in a graphical user interface 400a corresponding to the collection-posting user's user profile. As shown in FIG. 4A, for example, the viewer device 110a presents a posting-compilation tab 402 within the graphical user interface 400a. Although FIG. 4A depicts portions of a user profile comprising tabs, the social networking system 104 may provide such a user profile in various ways. For example, the social networking system 104 can provide the user profile comprising a different section representing a posting compilation and a different section representing a collections compilation.

Based on detecting a user selection of the posting-compilation tab 402, the viewer device 110a presents visual media items 404 from social networking posts corresponding to a posting compilation. Though FIG. 4A illustrates the visual media items 404 from social networking posts in a grid, the social networking system 104 can provide visual media items from social networking posts corresponding to a posting compilation in a variety of designs. For example, the viewer device 110a can present visual media items from social networking posts in a reverse chronological list.

As further shown in FIG. 4A, the viewer device 110a further presents a collections-compilation tab 406 within the graphical user interface 400a. Based on detecting a user selection of the collections-compilation tab 406, the viewer device 110a presents visual media items from collections posts corresponding to a collections compilation within a graphical user interface. FIG. 4B illustrates an example of such a graphical user interface. As illustrated in FIG. 4B, the viewer device 110a presents visual-media-collections icons 412 with a graphical user interface 400b. In particular, the viewer device 110a presents a cover image and a name for each visual media collection represented by the visual-media-collection icons 412.

Figure 4D:
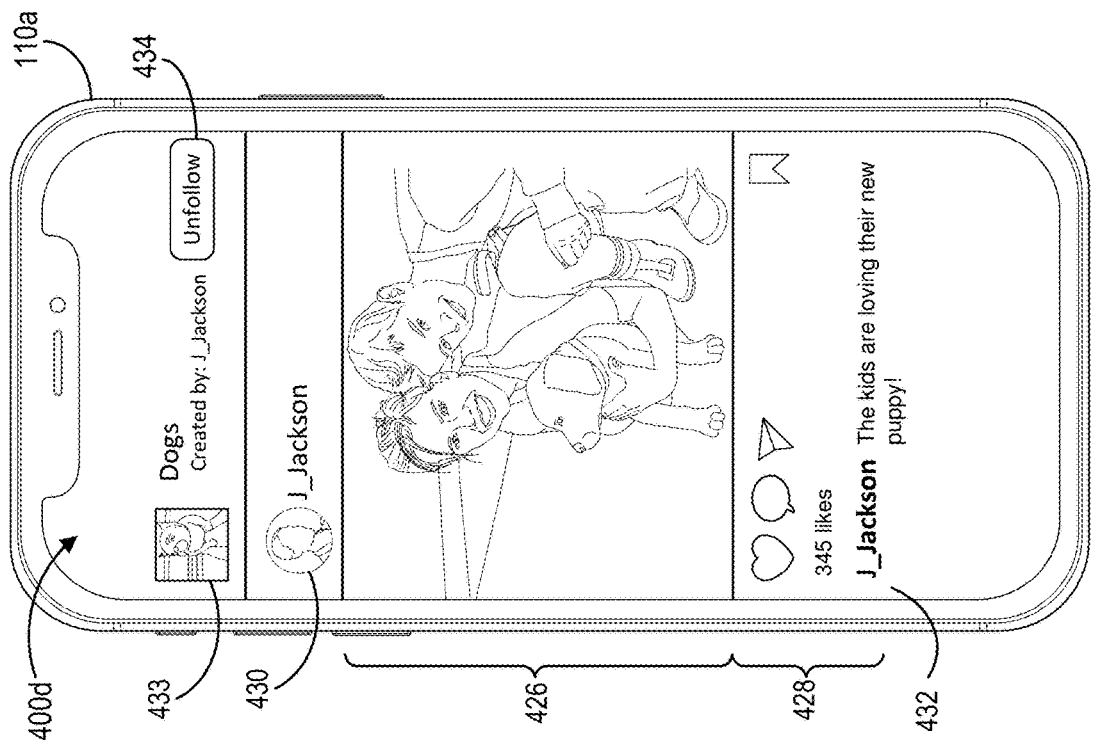
Figure 4C:
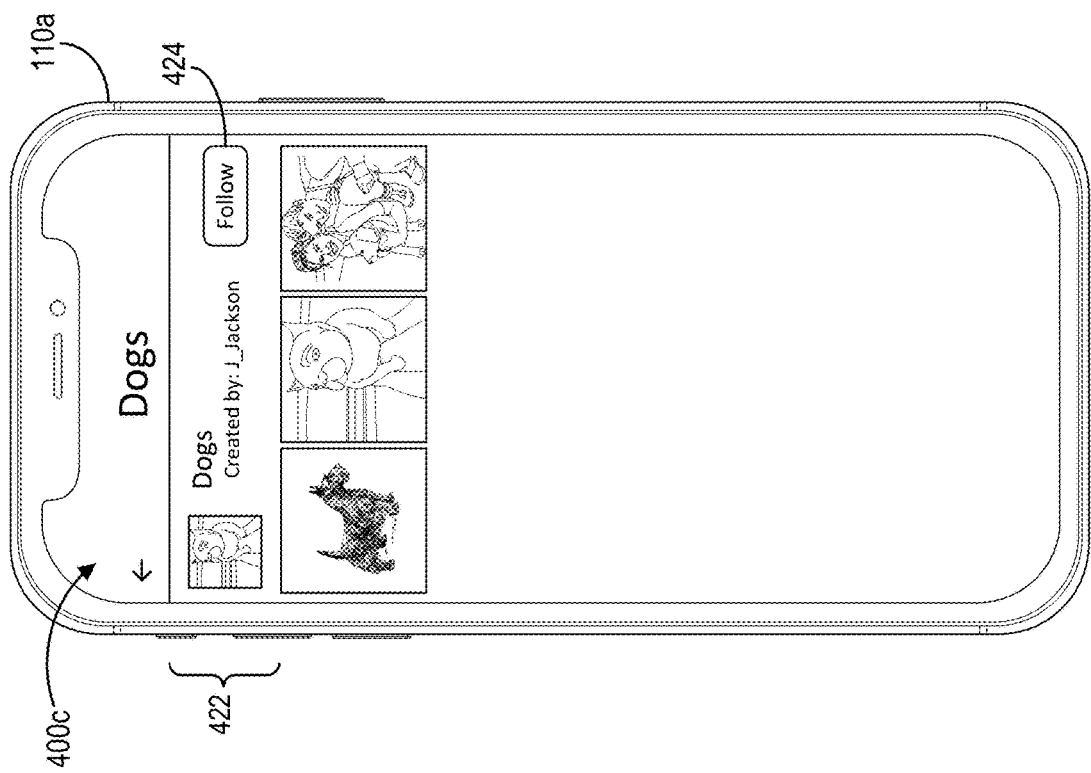

Upon receiving an indication of a user selection of a visual-media-collection icon from the visual-media-collections icons 412 from the viewer device 110a, the social networking system 104 can provide visual media items from the corresponding visual media collection for display within a graphical user interface of the viewer device 110a. FIG. 4C provides an example of such a graphical user interface. As shown in FIG. 4C, the viewer device 110a presents visual media items from a selected visual media collection (corresponding to the selected visual-media-collection icon) within a graphical user interface 400c.

In addition visual media items, the viewer device 110a presents a visual-media-collection-identifier 422 within the graphical user interface 400c. As shown in FIG. 4C, the visual-media-collection-identifier 422 includes a cover image, a title or name of the visual media collection, and a user identifier associated with the collection-posting user for the visual media collection. In one or more embodiments, the viewer device 110a can further present a description of the visual media collection and/or any user annotations (e.g. hashtags) associated with the visual media collection.

As further shown in FIG. 4C, the viewer device 110a presents a follow option 424 within the graphical user interface 400c. As discussed above, the social networking system 104 can provide a follow function for a visual media collection independent of any follow function for a collection-posting user. As indicated by FIG. 4C, the viewer device 110a detects a user selection of the follow option 424 and sends a request for the social networking account associated with the viewer device 110a to follow the visual media collection to the social networking system 104. Based on receiving the follow request, the social networking system 104 can provide collections posts comprising visual media items from the visual media collection to a social networking feed within the viewer device 110a.

In some embodiments, the social networking system 104 provides collections posts from the selected visual media collection to the viewer device 110a without regard to whether the social networking account associated with the viewer device 110a generally follows the social networking account for the collection-posting user. Indeed, if the social networking account associated with the viewer device 110a does not follow the social networking account for the collection-posting user, the social networking system 104 does not provide the collection-posting user's social networking posts to the social networking feed of the social networking account associated with the viewer device 110a. The social networking system 104 can accordingly provide follow functions for users and visual media collections on independent bases. This provides a more flexible approach to content management.

As discussed above, in one or more embodiments, the viewer device 110a presents collections posts comprising visual media items from a visual media collection followed by a social networking account. FIG. 4D illustrates the viewer device 110a presenting such a collections post in accordance with one or more embodiments. In particular, the viewer device 110a presents a collections post within a social networking feed, where the collections post includes a visual media item from a visual media collection followed by a social networking account corresponding to the viewer device 110a. The viewer device 110a presents the collections post based on determining that the social networking account associated with the viewer device 110a follows the corresponding visual media collection.

As further shown in FIG. 4D, the viewer device 110a presents a digital image 426, collections-post options 428, and a comment 432 corresponding to the collections post within the graphical user interface 400d. The digital image 426 represents a visual media item from a visual media collection. The collections-post options 428 includes various icons for various options corresponding to the collections post. For example, the collections-post options 428 include options to like the collections post, comment on the collections post, or share the collections post. The comment 432 corresponds to collections post.

In addition to the digital image 426 corresponding to the collections post, the viewer device 110a presents a posting-user-profile indicator 430 within the graphical user interface 400d. The posting-user-profile indicator 430 indicates the identity of the collection-posting user corresponding to the collections post. In addition to the posting-user-profile indicator 430, in some embodiments, the viewer device 110a presents an indication of the name of the visual media collection associated with the digital image 426 and corresponding collections post. In some cases, the viewer device 110a further presents include information about the visual media collection (e.g. visual media collection description or user annotations) within the graphical user interface 400d.

As further shown in FIG. 4D, the viewer device 110a presents a visual-media-collection indicator 433 within the graphical user interface 400d. More specifically, the viewer device 110a presents the visual-media-collection indicator 433 in a header bar above the collections post to indicate the visual media collection from which the collections post came. In one or more embodiments, the viewer device 110a presents the visual-media-collection indicator 433 as part of the collections post to communicate why a collections post is included in a social media feed.

As indicated above, in one or more embodiments, the viewer device 110a presents a collections post in a social networking feed based on the viewing user following a visual media collection. Accordingly, the viewer device 110a provides information corresponding to the visual media collection with the collections post. To indicate such visual-media-collection information, FIG. 4D illustrates the visual-media-collection indicator 433 including the cover photo, title, and collection-posting user corresponding to a visual media collection. However, a visual-media-collection indicator can include any of a variety of information corresponding to the visual media collection that includes the below collections post. For example, a visual-media-collection indicator can include the number of visual media items in the visual media collection, the number of users following the visual media collection, user annotations associated with the visual media collection, or other information about the visual media collection.

Additionally, as shown in FIG. 4D, the graphical user interface 400d includes an unfollow option 434. The unfollow option 434 indicates an option for the viewing user based on a current state of the viewing user with respect to the visual media collection. Because the viewing user currently follows the visual media collection corresponding to the collections post, the viewer device 110a presents the unfollow option 434 within the graphical user interface 400d. If the viewing user did not currently follow the visual media collection corresponding to the collections post, in certain implementations, the viewer device 110a would present a follow option to follow the corresponding visual media collection.

Upon receiving an indication of a user selection of the unfollow option 434, the social networking system 104 modifies the viewing user's social networking feed to no longer include collections post from the corresponding visual media collection. Accordingly, the unfollow button 343 provides increased efficiency in curation of a viewing user's social networking feed. Although FIG. 4D shows the unfollow option 434 as a graphical-user-interface element including the text "Unfollow," an unfollow option can be presented in accordance with a variety of designs. For example, the collector device 106 can present an options button or options menu and can include an unfollow option within the options button or the options menu.

Figure 5:
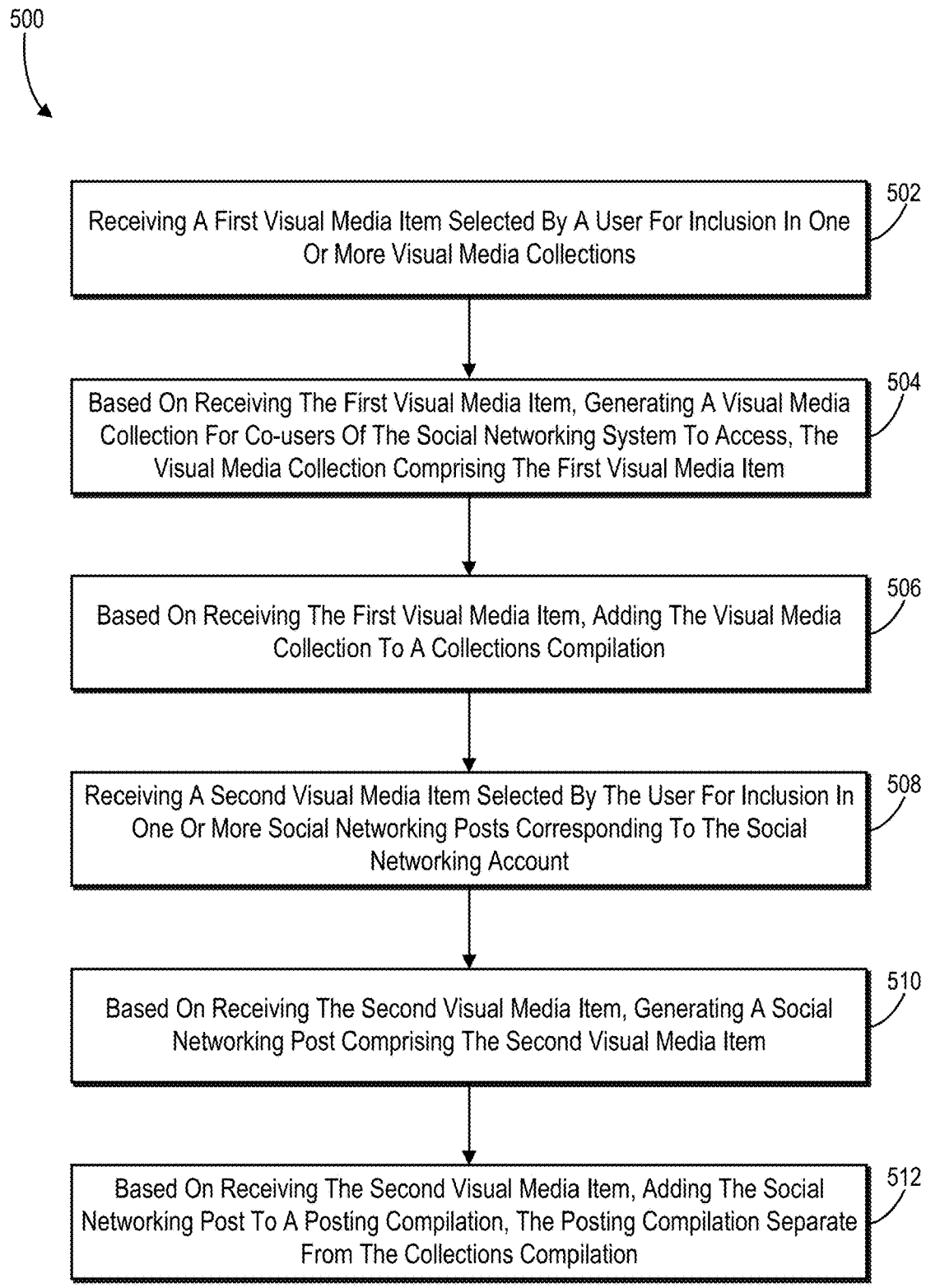
FIG. 5 illustrates a flowchart of a acts for generating a visual media collection comprising a visual media item separate from a social networking post for a social networking account in accordance with one or more embodiments.

FIGS. 1-4D, the corresponding text, and the examples provide a number of different methods, systems, devices, and non-transitory computer-readable media of the social networking system 104. In addition to the foregoing, one or more embodiments can also be described in terms of flowcharts comprising acts for accomplishing a particular result, as shown in FIG. 5. FIG. 5 can be performed with more or fewer acts. Further, the acts can be performed in differing orders. Additionally, the acts described herein can be repeated or performed in parallel with one another or parallel with different instances of the same or similar acts.

As mentioned above, FIG. 5 illustrates a flowchart of a acts 500 for the social networking system 104 in accordance with one or more embodiments. While FIG. 5 illustrates acts according to one embodiment, alternative embodiments can omit, add to, reorder, and/or modify any of the acts shown in FIG. 5. The acts of FIG. 5 can be performed as part of a method. Alternatively, a non-transitory computer-readable medium can comprise instructions that, when executed by one or more processors, cause a computing device to perform the acts of FIG. 5. In some embodiments, a system can perform the acts of FIG. 5.

As shown in FIG. 5, the acts 500 include an act 502 for receiving a first visual media item selected by a user for inclusion in one or more visual media collections. In particular, the act 502 can include receiving, from a client device, a first visual media item selected by a user of a social networking system for inclusion in one or more visual media collections corresponding to a social networking account. Further, in some cases, receiving the first visual media item selected by the user for inclusion in the one or more visual media collections comprises receiving an indication of a user selection of the first visual media item from the posting compilation of the social networking account.

As further shown in FIG. 5, the acts 500 include an act 504 for, based on receiving the first visual media item, generating a visual media collection for co-users of the social networking system to access, the visual media collection comprising the first visual media item. In particular, the act 504 can include, based on receiving the first visual media item, generating a visual media collection for one or more co-users of the social networking system to access, the visual media collection comprising the first visual media item for the social networking account.

As further shown in FIG. 5, the acts 500 include an act 506 for, based on receiving the first visual media item, adding the visual media collection to a collections compilation. In particular, the act 506 can include, based on receiving the first visual media item, adding the visual media collection to a collections compilation of the social networking account.

As further shown in FIG. 5, the acts 500 include an act 508 for receiving a second visual media item selected by the user for inclusion in one or more social networking posts corresponding to the social networking account. In particular, the act 508 can include receiving, from the client device, a second visual media item selected by the user for inclusion in one or more social networking posts corresponding to the social networking account.

As shown in FIG. 5, the acts 500 include an act 510 for, based on receiving the second visual media item, generating a social networking post comprising the second visual media item. In particular, the act 510 can include, based on receiving the second visual media item, generating a social networking post comprising the second visual media item for the social networking account.

As shown in FIG. 5, the acts 500 include an act 512 for, based on receiving the second visual media item, adding the social networking post to a posting compilation, the posting compilation separate from the collections compilation. In particular, the act 512 can include, based on receiving the second visual media item, adding the social networking post to a posting compilation of the social networking account, the posting compilation separate from the collections compilation.

Additionally, in some embodiments, receiving the first visual media item selected by the user for inclusion in the one or more visual media collections comprises receiving an indication of a user selection to include the first visual media item within a purchasable-items collection comprising one or more visual media items indicating purchasable items, and generating the visual media collection for the co-users to access comprises, based on the user selection to include the first visual media item within the purchasable-items collection, generating the purchasable-items collection comprising the first visual media item.

As suggested above, in some cases, the acts 500 further include providing, for display within a social networking feed on the client device, the first visual media item as part of an additional social networking post corresponding to an additional social networking account, wherein receiving the first visual media item selected by the user for inclusion in the one or more visual media collections comprises receiving an indication of a user selection of the first visual media item from the additional social networking post for inclusion in the visual media collection.

Further, in some embodiments, the acts 500 further include receiving, from the client device, an indication of a user selection of one or more contributors for the visual media collection; and based on the user selection of the one or more contributors, granting the one or more contributors access to add visual media items to the visual media collection.

As further noted above, in certain implementations, the acts 500 further include receiving, from an additional client device associated with an additional social networking account, a request to follow the visual media collection, and providing, for display on the additional client device within a social networking feed, the first visual media item from the visual media collection in a collections post separate from social networking posts corresponding to the social networking account.

Additionally, or alternatively, the acts 500 can include receiving, from an additional client device associated with an additional social networking account, a search query comprising a search term, and providing search results comprising the first visual media item from the visual media collection based on the search term corresponding to at least one of a name of the visual media collection, user annotations associated with the visual media collection, or an additional visual media item that is part of the visual media collection.

Figure 6:
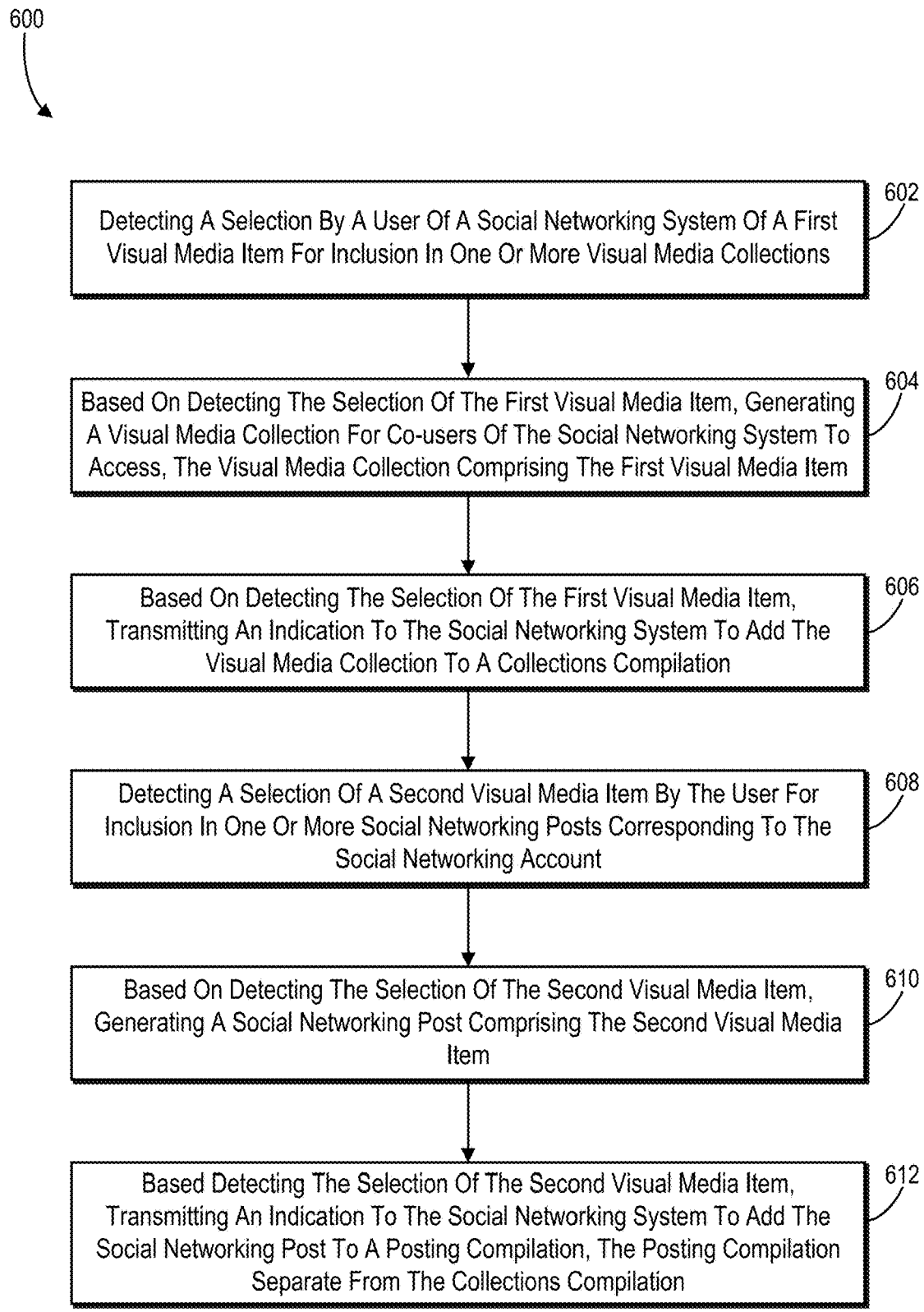
FIG. 6 illustrates a flowchart of acts for generating a visual media collection comprising a visual media item separate from a social networking post for a social networking account in accordance with one or more embodiments.

As mentioned above, FIG. 6 illustrates a flowchart of acts 600 for the social networking system 104 in accordance with one or more embodiments. While FIG. 6 illustrates acts according to one embodiment, alternative embodiments can omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the acts 600 include an act 602 for detecting a selection by a user of a social networking system of a first visual media item for inclusion in one or more visual media collections. In particular, the act 602 can include detecting a selection by a user of a social networking system of a first visual media item for inclusion in one or more visual media collections corresponding to a social networking account. In some cases, detecting the selection of the first visual media item for inclusion in the one or more visual media collections comprises detecting a user selection of the first visual media item from the posting compilation of the social networking account. As suggested above, in certain implementations, detecting the selection of the first visual media item comprises: detecting user input naming the visual media collection; based on a name of the visual media collection, presenting one or more suggested visual media items for inclusion in the visual media collection; and detecting a user selection of the first visual media item from the one or more suggested visual media items.

As further shown in FIG. 6, the acts 600 include an act 604 for, based on detecting the selection of the first visual media item, generating a visual media collection for co-users of the social networking system to access, the visual media collection comprising the first visual media item. In particular, the act 504 can include, based on detecting the selection of the first visual media item, generating a visual media collection for co-users of the social networking system to access, the visual media collection comprising the first visual media item for the social networking account.

As further shown in FIG. 6, the acts 600 include an act 606 for, based on detecting selection of the first visual media item, transmitting an indication to the social networking system to add the visual media collection to a collections compilation. In particular, the act 506 can include, based on detecting selection of the first visual media item, transmitting an indication to the social networking system to add the visual media collection to a collections compilation of the social networking account.

As further shown in FIG. 6, the acts 600 include an act 608 for detecting a selection of a second visual media item by the user for inclusion in one or more social networking posts corresponding to the social networking account and an act 610 for, based on detecting the selection of the second visual media item, generating a social networking post comprising the second visual media item. In particular, the act 610 can include, based on detecting the selection of the second visual media item, generating a social networking post comprising the second visual media item for the social networking account.

As shown in FIG. 6, the acts 600 include an act 612 for, based on detecting the selection of the second visual media item, transmitting an indication to the social networking system to add the social networking post to a posting compilation, the posting compilation separate from the collections compilation. In particular, the act 612 can include, based on detecting the selection of the second visual media item, transmitting an indication to the social networking system to add the social networking post to a posting compilation of the social networking account, the posting compilation separate from the collections compilation.

As suggested above, in certain implementations, detecting the selection of the first visual media item for inclusion in the one or more visual media collections comprises detecting a user selection to include the first visual media item within a purchasable-items collection comprising one or more visual media items indicating purchasable items; and generating the visual media collection comprises generating the purchasable-items collection comprising the first visual media item based on the selection to include the first visual media item within the purchasable-items collection.

As further suggested above, in some embodiments, the acts 600 further include detecting a user selection of one or more contributors for the visual media collection; and based on the user selection of the one or more contributors, sending an indication to a social networking system to grant the one or more contributors access to add visual media items to the visual media collection.

Additionally, or alternatively, in some cases, the acts 600 include presenting, within a social networking feed, the first visual media item as part of an additional social networking post corresponding to an additional social networking account; and detecting the selection of the first visual media item for inclusion in the one or more visual media collections by detecting a user selection of the first visual media item the additional social networking post for inclusion in the visual media collection.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
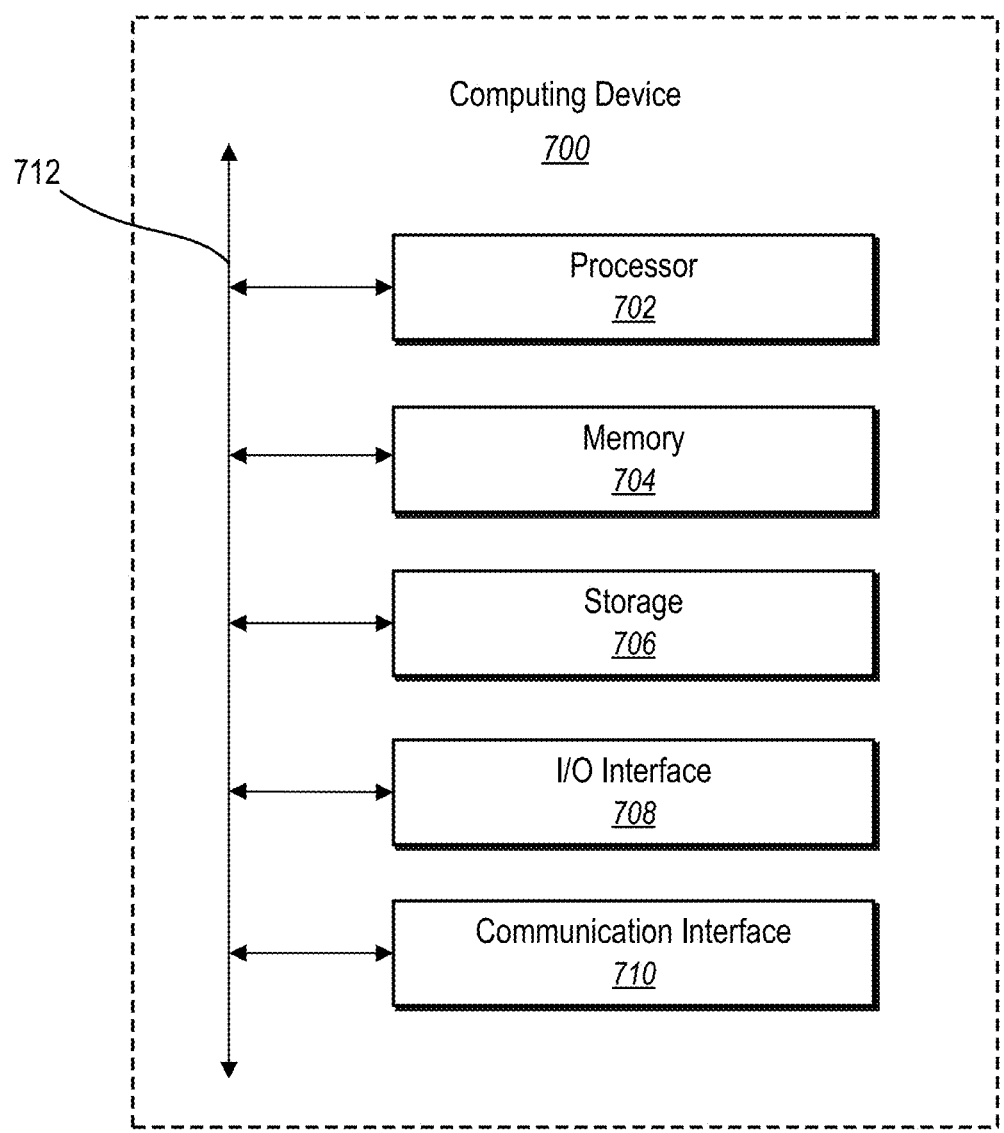
FIG. 7 illustrates a block diagram of an example computing device for implementing one or more embodiments of the present disclosure in accordance with one or more embodiments.

FIG. 7 illustrates a block diagram of exemplary computing device 700 that may be configured to perform one or more of the processes described above. One will appreciate that the computing device 700 may represent one or more client devices or server devices, such as those described previously mentioned (e.g., the server(s) 102, the collector device 106, the viewer devices 110a-110n). Further, the computing device 700 may represent various types of computing devices. For example, the computing device 700 can include: a mobile device such as a mobile telephone, a smartphone, a PDA, a tablet, a laptop; a non-mobile device such as a desktop or server; or any other type of computing device.

As shown by FIG. 7, the computing device 700 can comprise a processor 702, a memory 704, a storage device 706, an input/output ("I/O") interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7.

In one or more embodiments, the processor 702 includes hardware for executing instructions, such as those making up a computer program. The memory 704 may be used for storing data, metadata, and programs for execution by the processor(s). The storage device 706 includes storage for storing data or instructions.

The I/O interface 708 allows a user (e.g., content producer or viewer) to provide input to, receive output from, and otherwise transfer data to and receive data from computing device 700. The I/O interface 708 may include a mouse, a keypad or a keyboard, a touchscreen, a camera, an optical scanner, network interface, modem, other known I/O devices or a combination of such I/O interfaces. The I/O interface 708 may also include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, the communication interface 710 may include a network interface controller (NIC) or network adapter for communicating with an Ethernet or other wire-based network or a wireless NIC (WNIC) or wireless adapter for communicating with a wireless network, such as a WI-FI. The communication infrastructure 712 may include hardware, software, or both that connects components of the computing device 700 to each other. As an example, the communication infrastructure 712 may include one or more types of buses.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 8:
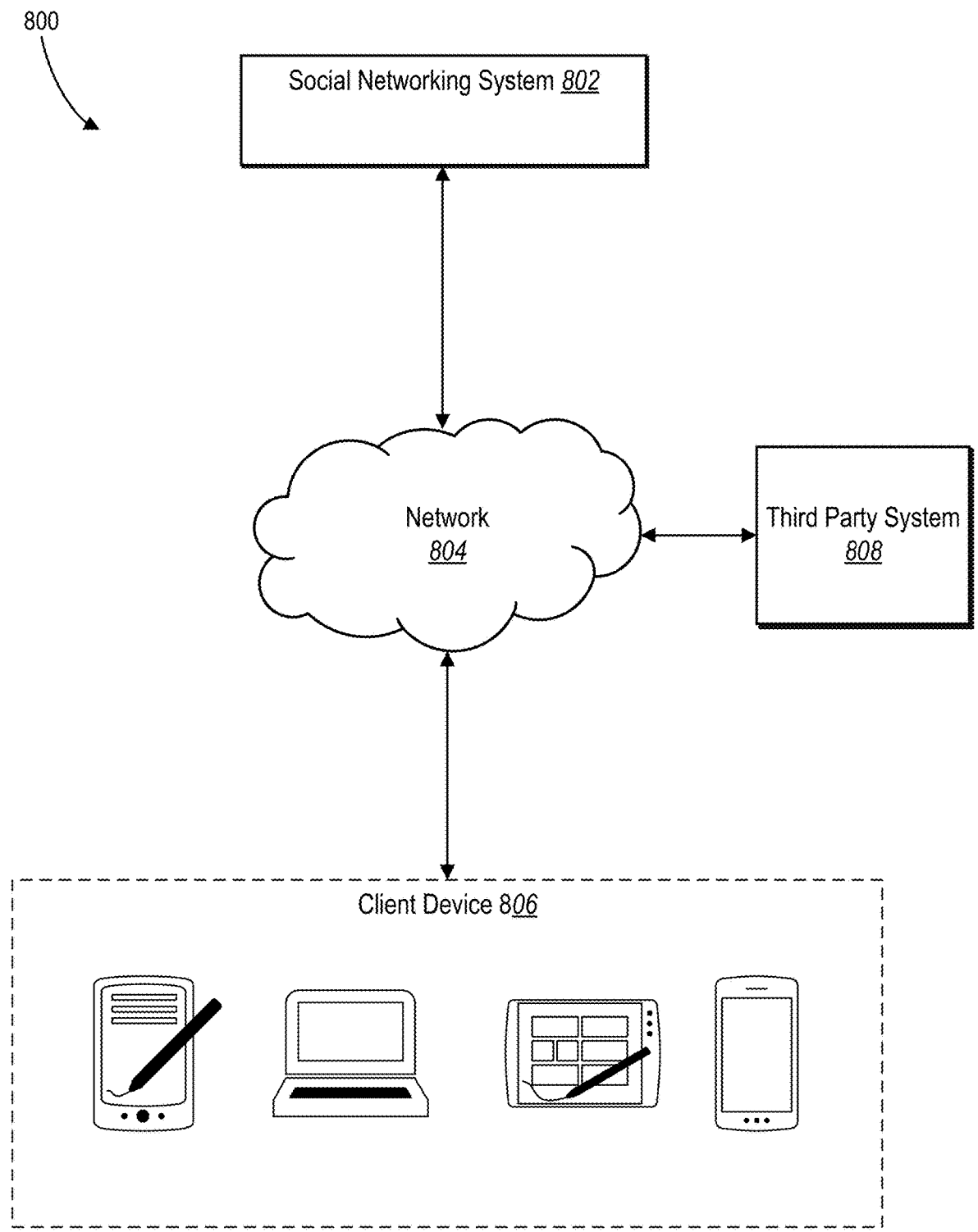
FIG. 8 illustrates a network environment of a social networking system according to one or more embodiments.

FIG. 8 illustrates an example network environment 800 of a social networking system. The network environment 800 includes a client device 806, a social networking system 802, and a third-party system 808 connected to each other by a network 804. Although FIG. 8 illustrates a particular arrangement of client device 806, the social networking system 802, the third-party system 808, and the network 804, this disclosure contemplates any suitable arrangement and number of client device 806, the social networking system 802, the third-party system 808, and the network 804.

Links may connect the client device 806, the social networking system 802, and the third-party system 808 to the network 804 or to each other. Links need not necessarily be the same throughout network environment 800. One or more first links may differ in one or more respects from one or more second links.

In some embodiments, the client device 806 may be an electronic device including hardware, software, or embedded logic components or a combination of two or more such components and capable of carrying out the appropriate functionalities implemented or supported by the client device 806. As an example, a client device 806 may include any of the computing devices discussed above in relation to FIG. 8. The client device 806 may enable a network user at the client device 806 to access the network 804. The client device 806 may enable its user to communicate with other users at other client devices or systems.

In some embodiments, the client device 806 may include a web browser, such as and may have one or more add-ons, plug-ins, or other extensions. The client device 806 may render a web page based on the HTML files from the server for presentation to the user.

In some embodiments, the social networking system 802 may be a network-addressable computing system that can host an online social network. In addition, the social networking system 802 may generate, store, receive, and send social-networking data, such as, for example, user-profile data, concept-profile data, the social-graph information, or other suitable data related to the online social network. The social networking system 802 may be accessed by the other components of the network environment 800 either directly or via the network 804.

As shown, the social networking system 802 includes the social networking system 104, which is described above. The social networking system 104 may be implemented on a unitary server or a distributed server spanning multiple computers or multiple datacenters. These servers may be of various types, such as, for example and without limitation, web server, news server, mail server, message server, advertising server, file server, application server, exchange server, database server, proxy server, etc., or any combination thereof.

In some embodiments, the social networking system 802 may include one or more data stores. Data stores may be used to store various types of information. In some embodiments, the information stored in data stores may be organized according to specific data structures. Particular embodiments may provide interfaces that enable the client device 806, the social networking system 802, or the third-party system 808 to manage, retrieve, modify, add, or delete, the information stored in data stores.

In some embodiments, the social networking system 802 may store one or more social graph, described below. In one or more embodiments, the social networking system 802 may provide users with the ability to take actions on various types of items or objects, supported by social networking system 802. As an example, the items and objects may include groups or social networks to which users of the social networking system 802 may belong, events or calendar entries in which a user might be interested, computer-based applications that a user may use, transactions that allow users to buy or sell items via the customer service, interactions with advertisements that a user may perform, etc. A user may also interact with anything that is capable of being represented in the social networking system 802 or by an external system of the third-party system 808, which is separate from the social networking system 802 and coupled to the social networking system 802 via the network 804.

The social networking system 802 can include a variety of stores, modules, and/or managers as described below. In one or more embodiments, a connection manager may be used for storing connection information about users. The connection information may indicate users who have similar or common work experience, group memberships, hobbies, educational history, or are in any way related or share common attributes. The connection information may also include user-defined connections between different users and content (both internal and external). An action-logging manager may be used to receive communications from a web server about a user's actions on or off the social networking system 802. In conjunction with the action log, a third-party content object log may be maintained of user exposures to third-party content objects. An advertisement-pricing module may combine social information, the current time, location information, or other suitable information to provide relevant advertisements, in the form of notifications, to a user.

Authorization servers may be used to enforce one or more privacy settings of the users of the social networking system 802. A privacy setting of a user determines how particular information associated with a user can be shared. The authorization server may allow users to opt in to or opt out of having their actions logged by the social networking system 802 or shared with other systems (e.g., the third-party system 808), such as, for example, by setting appropriate privacy settings.

In some embodiments, the third-party system 808 may include one or more types of servers, one or more data stores, one or more interfaces, including but not limited to APIs, one or more web services, one or more content sources, one or more networks, or any other suitable components. The third-party system 808 may be operated by a different entity from an entity operating the social networking system 802 even if, in some embodiments, the social networking system 802 and the third-party systems 808 operate in conjunction with each other. In this sense, the social networking system 802 may provide a platform, or backbone, which other systems, such as the third-party systems 808, may use to provide social-networking services and functionality to users across the Internet.

In some embodiments, a third-party system 808 may include a third-party content object provider. A third-party content object provider may include one or more sources of content objects, which may be communicated to the client device 806. As an example, content objects may include information regarding things or activities of interest to the user. As another example, content objects may include incentive content objects.

Figure 9:
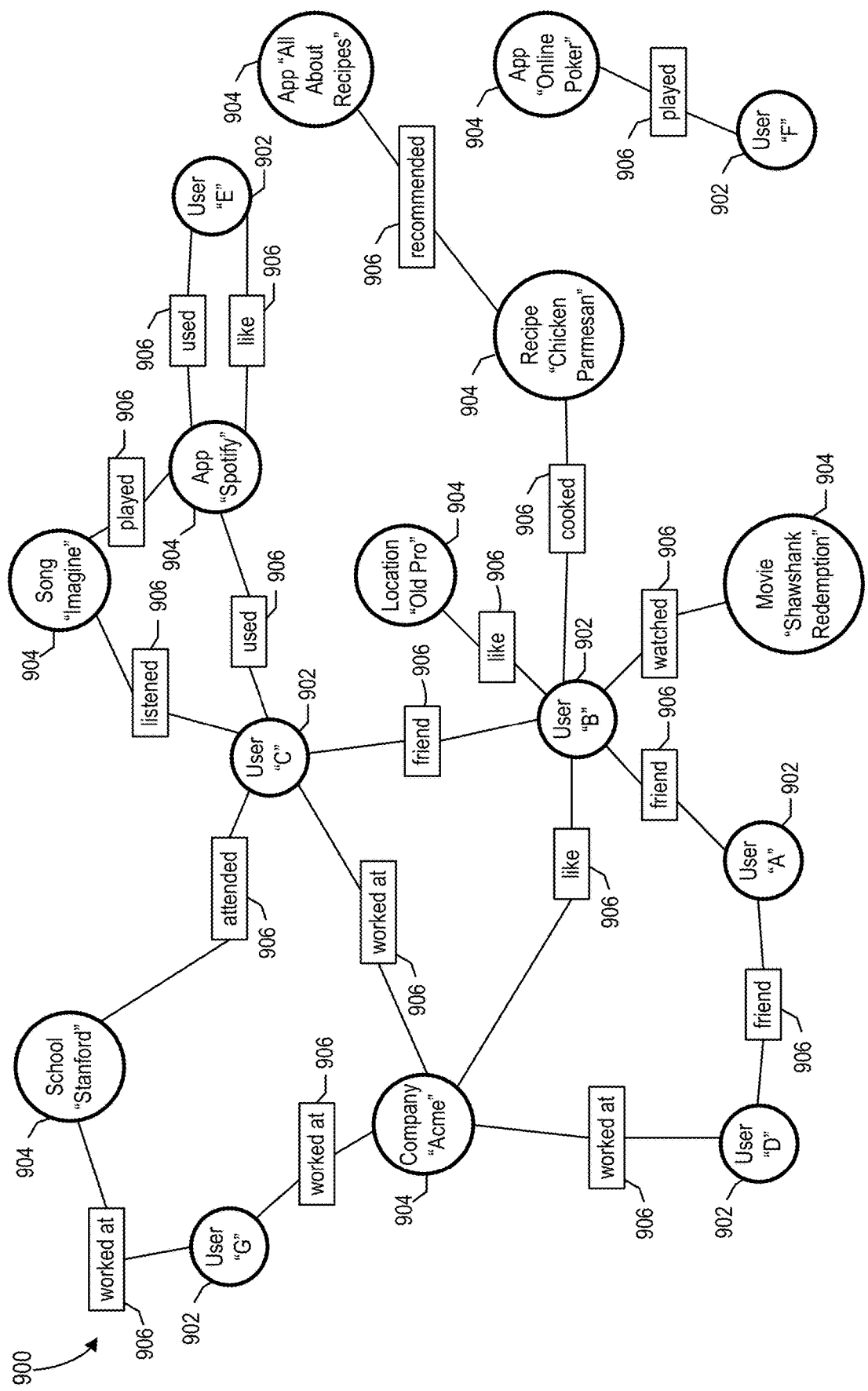
FIG. 9 illustrates an example social graph for a social networking system in accordance with one or more embodiments.

FIG. 9 illustrates an example social graph 900. In some embodiments, the social networking system 802 may store one or more social graphs 900 in one or more data stores. In some embodiments, the social graph 900 may include multiple nodes—which may include multiple user nodes or multiple concept nodes—and multiple edges 906 connecting the nodes. The social graph 900 illustrated in FIG. 9 is shown, for didactic purposes, in a two-dimensional visual map representation.

In some embodiments, a user node 902 may correspond to a user of social networking system 802. When a user registers for an account with social networking system 802, the social networking system 802 may create a user node 902 corresponding to the user and store the user node 902 in one or more data stores. Users and user nodes described herein may, where appropriate, refer to registered users and user nodes associated with registered users.

In some embodiments, a concept node 904 may correspond to a concept. As an example, a concept may correspond to a place, a website, an entity, a resource, etc. A concept may be located within social networking system 802 or on an external server. A concept node 904 may be associated with information of a concept provided by a user or information gathered by various systems, including the social networking system 802.

In some embodiments, a node in social graph 900 may represent or be represented by an online profile page. Profile pages may be hosted by or accessible to social networking system 802. Profile pages may be viewable by all or a selected subset of other users. As an example, a user node 902 may have a corresponding user-profile page where the corresponding user may add content, make declarations, or otherwise express him or herself. As another example, a concept node 904 may have a corresponding concept-profile page in which one or more users may add content, make declarations, or express themselves, particularly in relation to the concept corresponding to concept node 904.

As an example, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships.

In some embodiments, a pair of nodes in social graph 900 may be connected to each other by one or more edges 906. An edge 906 connecting a pair of nodes may represent a relationship between the pair of nodes. In some embodiments, an edge 906 may include or represent one or more data objects or attributes corresponding to the relationship between a pair of nodes. As an example, a first user may indicate that a second user is a "friend" of the first user. In response to this indication, the social networking system 802 may send a "friend request" to the second user. If the second user confirms the "friend request," the social networking system 802 may create an edge 906 connecting the first user's user node 902 to the second user's user node 902 in social graph 900 and store edge 906 as social-graph information in one or more of data stores.

In some embodiments, an edge 906 between a user node 902 and a concept node 904 may represent a particular action or activity performed by a user associated the with the user node 902 toward a concept associated with the concept node 904. As an example, as illustrated in FIG. 9, a user may "like," "attended," "played," "listened," "cooked," "worked at," or "watched" a concept, each of which may correspond to an edge type or subtype.

In some embodiments, the social networking system 802, the client device 806, or the third-party system 808 may access the social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In some embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition, or as an alternative, an advertisement may be one or more sponsored stories (e.g., a news feed or ticker item on the social networking system 802).

An advertisement may also include social networking system functionality with which a user may interact. As an example, an advertisement may enable a user to "like" or otherwise endorse the advertisement by selecting an icon or link associated with an endorsement. In addition, or as an alternative, an advertisement may include social networking system context directed to the user. As an example, an advertisement may display information about a friend of the user within social networking system 802 who has taken an action associated with the subject matter of the advertisement.

In some embodiments, the social networking system 802 may determine the social-graph affinity (herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity.

In some embodiments, the social networking system 802 may measure or quantify social-graph affinity using an affinity coefficient (herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions.

Coefficients may be used to predict any number of actions, which may be within or outside of the online social network. As an example, these actions may include various types of communications, such as sending messages, posting content, or commenting on content; various types of observation actions, such as accessing or viewing profile pages, media, or other suitable content; various types of coincidence information about two or more social-graph entities, such as purchasing a product from a merchant.

In some embodiments, the social networking system 802 may use a variety of factors to calculate a coefficient. These factors may include, for example, user actions, types of relationships between objects, location information, other suitable factors, or any combination thereof. In some embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user.

To calculate the coefficient of a user towards a particular object, the rating assigned to the user's actions may comprise, for example, 60% of the overall coefficient, while the relationship between the user and the object may comprise 40% of the overall coefficient. In some embodiments, the social networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof.

A coefficient may include a decay factor that causes the strength of the signal provided by particular actions to decay with time, such that actions that are more recent are more relevant when calculating the coefficient. The ratings and weights may be continuously updated based on continued tracking of the actions upon which the coefficient is based. Any process or algorithm may be employed for assigning, combining, averaging, and so forth the ratings for each factor and the weights assigned to the factors. In some embodiments, the social networking system 802 may determine coefficients using machine-learning algorithms trained on historical actions and past user responses, or data farmed from users by exposing them to various options and measuring responses.

In some embodiments, the social networking system 802 may calculate a coefficient based on a user's actions. The social networking system 802 may monitor such actions on the online social network, on the third-party system 808, on other suitable systems, or any combination thereof. Typical user actions include viewing profile pages, creating or posting content, interacting with content, joining groups, listing and confirming attendance at events, checking-in at locations, liking particular pages, creating pages, and performing other tasks that facilitate social action.

In some embodiments, the social networking system 802 may calculate a coefficient based on the user's actions with particular types of content. The content may be associated with the online social network, the third-party system 808, or another suitable system. The social networking system 802 may analyze a user's actions to determine whether one or more of the actions indicate an affinity for subject matter, content, other users, and so forth.

In some embodiments, the social networking system 802 may calculate a coefficient based on the type of relationship between particular objects. Referencing the social graph 900, the social networking system 802 may analyze the number and/or type of edges 906 connecting particular user nodes and concept nodes 904 when calculating a coefficient. As an example, depending upon the weights assigned to the actions and relationships for the particular user, the overall affinity may be determined to be higher for content about a user's spouse than for content about a user's friend.

In some embodiments, the coefficient may be based on the degree of separation between particular objects. The degree of separation between any two nodes is defined as the minimum number of hops needed to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are not connected directly, but are connected through another user node (i.e., are second-degree nodes) may be described as "friends of friends." The lower coefficient may represent the decreasing likelihood that the first user will share an interest in content objects of the user that is indirectly connected to the first user in the social graph 900.

In some embodiments, the social networking system 802 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 806 of the user). A first user may be more interested in other users or concepts that are closer to the first user. As an example, if a user is one mile from an airport and two miles from a gas station, the social networking system 802 may determine that the user has a higher coefficient for the airport than the gas station based on the proximity of the airport to the user.

In some embodiments, the social networking system 802 may perform particular actions with respect to a user based on the coefficient information. The coefficients may be used to predict whether a user will perform a particular action based on the user's interest in the action. A coefficient may be used when generating or presenting any type of objects to a user. The coefficient may also be utilized to rank and order such objects, as appropriate. In this way, the social networking system 802 may provide information that is relevant to user's interests and current circumstances, increasing the likelihood that they will find such information of interest.

In some embodiments, the social networking system 802 may generate search results based on the coefficient information. Search results for a particular user may be scored or ranked based on the coefficient associated with the search results with respect to the querying user. As an example, search results corresponding to objects with higher coefficients may be ranked higher on a search-results page than results corresponding to objects having lower coefficients.

In connection with social-graph affinity and affinity coefficients, particular embodiments may utilize one or more systems, components, elements, functions, methods, operations, or steps disclosed in U.S. patent application Ser. No. 11/503,093, filed Aug. 10, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In some embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. In some embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network.

In some embodiments, one or more servers may be authorization/privacy servers for enforcing privacy settings. In response to a request from a user (or other entity) for a particular object stored in a data store, the social networking system 802 may send a request to the data store for the object. The request may identify the user associated with the request and may be sent to the user (or the client device 806 of the user) if the authorization server determines that the user is authorized to access the object based on the privacy settings associated with the object, but not otherwise.

The preceding specification is described with reference to specific exemplary embodiments thereof. The description above and drawings are illustrative and are not to be construed as limiting. The additional or alternative embodiments may be embodied in other specific forms without departing from its spirit or essential characteristics. The scope of the invention is, therefore, indicated by the appended claims rather than by the preceding description. All changes that come within the meaning and range of equivalency of the claims are to be embraced within their scope.

I claim:

1. A method comprising:
receiving, from a client device, a first visual media item selected by a user of a social networking system for inclusion in one or more visual media collections corresponding to a social networking account associated with a user profile graphical user interface;
based on receiving the first visual media item:
generating a visual media collection for one or more co-users of the social networking system to access, the visual media collection comprising the first visual media item and one or more additional media items selected by the one or more co-users of the social networking system to group together in the visual media collection; and
adding the visual media collection to a collections compilation portion of the user profile graphical user interface, wherein the collections compilation portion comprises a grouping of visual media collections and each visual media collection of the grouping of visual media collections comprises a plurality of visual media items;
receiving, from the client device, a second visual media item selected by the user for inclusion in one or more social networking posts corresponding to the social networking account associated with the user profile graphical user interface; and
based on receiving the second visual media item:
generating a social networking post comprising the second visual media item for the social networking account; and
adding the social networking post to a posting compilation portion of the user profile graphical user interface comprising a plurality of visual media items corresponding to a plurality of social networking posts, the posting compilation portion of the user profile graphical user interface located in a separate portion of the user profile graphical user interface from the collections compilation portion of the user profile graphical user interface.

2. The method of claim 1, further comprising:
receiving, from an additional client device associated with an additional social networking account, a request to follow the visual media collection; and
providing, for display on the additional client device within a social networking feed, the first visual media item from the visual media collection in a collections post separate from social networking posts corresponding to the social networking account.

3. The method of claim 1, further comprising:
receiving, from the client device, an indication of a user selection of one or more contributors for the visual media collection; and
based on the user selection of the one or more contributors, granting the one or more contributors access to add visual media items to the visual media collection.

4. The method of claim 1, wherein:
receiving the first visual media item selected by the user for inclusion in the one or more visual media collections comprises receiving an indication of a user selection to include the first visual media item within a purchasable-items collection comprising one or more visual media items indicating purchasable items; and
generating the visual media collection for the one or more co-users to access comprises, based on the user selection to include the first visual media item within the purchasable-items collection, generating the purchasable-items collection comprising the first visual media item.

5. The method of claim 1, wherein receiving the first visual media item selected by the user for inclusion in the one or more visual media collections comprises:
receiving an indication of a user selection of the first visual media item from the posting compilation portion of the user profile graphical user interface, and
displaying an aggregate-collection icon representing the visual media collection within the collections compilation portion of the user profile graphical user interface.

6. The method of claim 1, further comprising:
providing, for display within a social networking feed on the client device, the first visual media item as part of an additional social networking post corresponding to an additional social networking account;
wherein receiving the first visual media item selected by the user for inclusion in the one or more visual media collections comprises receiving an indication of a user selection of the first visual media item from the additional social networking post for inclusion in the visual media collection.

7. The method of claim 1, further comprising:
receiving, from an additional client device associated with an additional social networking account, a search query comprising a search term; and
providing search results comprising the first visual media item from the visual media collection based on the search term corresponding to at least one of a name of the visual media collection, user annotations associated with the visual media collection, or an additional visual media item that is part of the visual media collection.

8. A non-transitory computer readable medium storing instructions thereon that, when executed by at least one processor, cause a computing device to:
detect a selection by a user of a social networking system of a first visual media item for inclusion in one or more visual media collections corresponding to a social networking account associated with a user profile graphical user interface;
based on detecting the selection of the first visual media item:
generate a visual media collection for one or more co-users of the social networking system to access, the visual media collection comprising the first visual media item and one or more additional media items selected by the one or more co-users of the social networking system to group together in the visual media collection; and
transmit an indication to a social networking system to add the visual media collection to a collections compilation portion of the user profile graphical user interface, wherein the collections compilation portion comprises a grouping of visual media collections and each visual media collection of the grouping of visual media collections comprises a plurality of visual media items;
detect a selection by the user of a second visual media item for inclusion in one or more social networking posts corresponding to the social networking account associated with the user profile graphical user interface; and
based on detecting the selection of the second visual media item:
generate a social networking post comprising the second visual media item for the social networking account; and
transmit an indication to the social networking system to add the social networking post to a posting compilation portion of the user profile graphical user interface comprising a plurality of visual media items corresponding to a plurality of social networking posts, the posting compilation portion of the user profile graphical user interface located in a separate portion of the user profile graphical user interface from the collections compilation portion of the user profile graphical user interface.

9. The non-transitory computer readable medium of claim 8, further comprising instructions that, when executed by the at least one processor, cause the computing device to:
detect a user selection of one or more contributors for the visual media collection; and
based on the user selection of the one or more contributors, send an indication to a social networking system to grant the one or more contributors access to add visual media items to the visual media collection.

10. The non-transitory computer readable medium of claim 8, further comprising instructions that, when executed by the at least one processor, further cause the computing device to:
detect the selection of the first visual media item for inclusion in the one or more visual media collections by detecting a user selection to include the first visual media item within a purchasable-items collection comprising one or more visual media items indicating purchasable items; and
generate the visual media collection by generating the purchasable-items collection comprising the first visual media item based on the selection to include the first visual media item within the purchasable-items collection.

11. The non-transitory computer readable medium of claim 8, further comprising instructions that, when executed by the at least one processor, cause the computing device to:

detect a selection of a collections-compilation tab within in the user profile graphical user interface; and display the visual media collection comprising the first visual media item and the one or more additional media items within the collections compilations portion of the user profile graphical user interface.

12. The non-transitory computer readable medium of claim 8, further comprising instructions that, when executed by the at least one processor, cause the computing device to:

present, within a social networking feed, the first visual media item as part of an additional social networking post corresponding to an additional social networking account; and detect the selection of the first visual media item for inclusion in the one or more visual media collections by detecting a user selection of the first visual media item the additional social networking post for inclusion in the visual media collection.

13. The non-transitory computer readable medium of claim 8, further comprising instructions that, when executed by the at least one processor, cause the computing device to detect the selection of the first visual media item by:

detecting user input naming the visual media collection;

based on a name of the visual media collection, presenting one or more suggested visual media items for inclusion in the visual media collection; and detecting a user selection of the first visual media item from the one or more suggested visual media items.

14. A system comprising:

at least one processor; and at least one non-transitory computer-readable storage medium storing instructions that, when executed by the at least one processor, cause the system to:

receive, from a client device, a first visual media item selected by a user of a social networking system for inclusion in one or more visual media collections corresponding to a social networking account associated with a user profile graphical user interface;

based on receiving the first visual media item:

generate a visual media collection for one or more co-users of the social networking system to access, the visual media collection comprising the first visual media item and one or more additional media items selected by the one or more co-users of the social networking system to group together in the visual media collection; and add the visual media collection to a collections compilation portion of the user profile graphical user interface, wherein the collections compilation portion comprises a grouping of visual media collections and each visual media collection of the grouping of visual media collections comprises a plurality of visual media items;

receiving, from the client device, a second visual media item selected by the user for inclusion in one or more social networking posts corresponding to the social networking account associated with the user profile graphical user interface;

based on receiving the second visual media item:

generate a social networking post comprising the second visual media item for the social networking account; and add the social networking post to a posting compilation portion of the user profile graphical user interface comprising a plurality of visual media items corresponding to a plurality of social networking posts, the posting compilation portion of the user profile graphical user interface located in a separate portion of the user profile graphical user interface from the collections compilation portion of the user profile graphical user interface.

15. The system of claim 14, further comprising instructions that, when executed by the at least one processor, cause the system to:

receive, from an additional client device associated with an additional social networking account, a request to follow the visual media collection; and provide, for display on the additional client device within a social networking feed, the first visual media item from the visual media collection in a collections post in an additional collections compilation collection portion of an additional user profile graphical user interface on the additional client device located in a separate portion of the additional user profile graphical user interface from social networking posts corresponding to the additional social networking account.

16. The system of claim 14, further comprising instructions that, when executed by the at least one processor, cause the system to:

receive, from the client device, an indication of a user selection of one or more contributors for the visual media collection; and based on the user selection of the one or more contributors, grant the one or more contributors access to add visual media items to the visual media collection.

17. The system of claim 14, further comprising instructions that, when executed by the at least one processor, cause the system to:

receive the first visual media item selected by the user for inclusion in the one or more visual media collections by receiving an indication of a user selection to include the first visual media item within a purchasable-items collection comprising one or more visual media items indicating purchasable items; and generate the visual media collection for the one or more co-users to access by generating the purchasable-items collection comprising the first visual media item based on the user selection to include the first visual media item within the purchasable-items collection.

18. The system of claim 14, further comprising instructions that, when executed by the at least one processor, cause the system to:

receive the first visual media item by receiving an indication of a user selection of the first visual media item from the posting compilation portion of the user profile graphical user interface; and display an aggregate-collection icon representing the visual media collection within the collections compilation portion of the user profile graphical user interface.

19. The system of claim 14, further comprising instructions that, when executed by the at least one processor, cause the system to:

provide, for display within a social networking feed on the client device, the first visual media item as part of an additional social networking post corresponding to an additional social networking account; and receive the first visual media item selected by the user for inclusion in the one or more visual media collections by receiving an indication of a user selection of the first visual media item from the additional social networking post for inclusion in the visual media collection.

20. The system of claim 14, further comprising instructions that, when executed by the at least one processor, cause the system to:
- receive, from an additional client device associated with an additional social networking account, a search query comprising a search term; and
- provide search results comprising the first visual media item from the visual media collection based on the search term corresponding to at least one of a name of the visual media collection, user annotations associated with the visual media collection, or an additional visual media item associated with the first visual media item and part of the visual media collection.

* * * * *